United States Patent
Minezawa et al.

(10) Patent No.: US 9,736,478 B2
(45) Date of Patent: Aug. 15, 2017

(54) IMAGE ENCODING DEVICE, IMAGE DECODING DEVICE, IMAGE ENCODING METHOD, AND IMAGE DECODING METHOD FOR GENERATING A PREDICTION IMAGE

(71) Applicant: Mitsubishi Electric Corporation, Tokyo (JP)

(72) Inventors: Akira Minezawa, Tokyo (JP); Kazuo Sugimoto, Tokyo (JP); Shunichi Sekiguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/977,045

(22) Filed: Dec. 21, 2015

(65) Prior Publication Data

US 2016/0156929 A1 Jun. 2, 2016

Related U.S. Application Data

(62) Division of application No. 13/979,357, filed as application No. PCT/JP2012/000061 on Jan. 6, 2012, now Pat. No. 9,299,133.

(30) Foreign Application Priority Data

Jan. 12, 2011 (JP) .................. 2011-004038

(51) Int. Cl.
*H04N 19/00* (2014.01)
*H04N 19/117* (2014.01)
(Continued)

(52) U.S. Cl.
CPC .............. *H04N 19/117* (2014.11); *G06T 5/20* (2013.01); *G06T 9/004* (2013.01); *H04N 19/105* (2014.11);
(Continued)

(58) Field of Classification Search
None
See application file for complete search history.

(56) References Cited

U.S. PATENT DOCUMENTS 6,041,145 A 3/2000 Hayashi et al.
6,167,164 A 12/2000 Lee
(Continued)

FOREIGN PATENT DOCUMENTS

EP 1 551 184 A2 7/2005
EP 2262267 A1 12/2010
(Continued)

OTHER PUBLICATIONS

T. Wiegand, G. J. Sullivan, G. Bjontegaard and A. Luthra, "Overview of the H.264/AVC video coding standard," in IEEE Transactions on Circuits and Systems for Video Technology, vol. 13, No. 7, pp. 560-576, Jul. 2003. doi: 10.1109/TCSVT.2003.815165.*
(Continued)

*Primary Examiner* — Utpal Shah
(74) *Attorney, Agent, or Firm* — Birch, Stewart, Kolasch & Birch, LLP

(57) ABSTRACT

When carrying out an average prediction, an intra predictor carries out a filtering process on target pixels of the intra prediction located at an upper end and a left end of the block, the filtering process using an intermediate prediction value, which is an average value of adjacent pixels of the block, and at least one adjacent pixel of the target pixel. The intra predictor also sets a filter coefficient to ½, associated with the intermediate prediction value for a target pixel at an upper left corner of the block, and sets a filter coefficient to ¼, associated with an adjacent pixel adjacent to an upper side or a left side of the target pixel. As a result, prediction errors locally occurring can be reduced, and the image quality can be improved.

4 Claims, 18 Drawing Sheets

(51) Int. Cl.
*G06T 5/20* (2006.01)
*G06T 9/00* (2006.01)
*H04N 19/61* (2014.01)
*H04N 19/11* (2014.01)
*H04N 19/182* (2014.01)
*H04N 19/176* (2014.01)
*H04N 19/44* (2014.01)
*H04N 19/593* (2014.01)
*H04N 19/80* (2014.01)
*H04N 19/82* (2014.01)
*H04N 19/105* (2014.01)
*H04N 19/96* (2014.01)

(52) U.S. Cl.
CPC .......... *H04N 19/11* (2014.11); *H04N 19/176* (2014.11); *H04N 19/182* (2014.11); *H04N 19/44* (2014.11); *H04N 19/593* (2014.11); *H04N 19/61* (2014.11); *H04N 19/80* (2014.11); *H04N 19/82* (2014.11); *H04N 19/96* (2014.11)

(56) References Cited

U.S. PATENT DOCUMENTS

| | | | |
|---|---|---|---|
| 6,188,799 | B1 | 2/2001 | Tan et al. |
| 6,862,319 | B2 | 3/2005 | Wu |
| 9,299,133 | B2 * | 3/2016 | Minezawa ................ G06T 5/20 |
| 2003/0223645 | A1 | 12/2003 | Sun et al. |
| 2005/0013376 | A1 | 1/2005 | Dattani et al. |
| 2006/0126730 | A1 | 6/2006 | Arakawa et al. |
| 2007/0053433 | A1 | 3/2007 | Song |
| 2007/0053443 | A1 | 3/2007 | Song |
| 2007/0121731 | A1 | 5/2007 | Tanizawa et al. |
| 2007/0206872 | A1 | 9/2007 | Song |
| 2008/0232705 | A1 | 9/2008 | Sohn et al. |
| 2008/0240238 | A1 | 10/2008 | Yoshino et al. |
| 2009/0003441 | A1 | 1/2009 | Sekiguchi et al. |
| 2009/0110069 | A1 | 4/2009 | Jung et al. |
| 2011/0103475 | A1 | 5/2011 | Alshina et al. |
| 2011/0194603 | A1 | 8/2011 | Laimema et al. |
| 2011/0255600 | A1 | 10/2011 | Lin et al. |
| 2012/0014445 | A1 | 1/2012 | Ma et al. |
| 2012/0044993 | A1 | 2/2012 | Sato |
| 2012/0106652 | A1 | 5/2012 | Huang et al. |
| 2013/0034158 | A1 | 2/2013 | Kirchhoffer et al. |
| 2013/0272405 | A1 | 10/2013 | Jeon et al. |

FOREIGN PATENT DOCUMENTS

| | | |
|---|---|---|
| JP | 9-187008 A | 7/1997 |
| JP | 10224790 A | 8/1998 |
| JP | 10322695 A | 12/1998 |
| KP | 10-2010-003438 A | 3/2010 |
| WO | WO 2009/120040 A2 | 10/2009 |
| WO | WO 2010/002214 A2 | 1/2010 |
| WO | WO 2010/143427 A1 | 12/2010 |
| WO | WO 2011/132400 A1 | 10/2011 |
| WO | WO 2012/008125 A1 | 1/2012 |
| WO | WO 2012/042720 A1 | 4/2012 |

OTHER PUBLICATIONS

"Advanced video coding for generic audiovisual services", MPEG-4 AVC(ISO/IEC 14496-10) / ITU-TH.264, Series H: Audiovisual and Multimedia Systems, Infrastructure of audiovisual services—Coding of moving video, Mar. 2010, pp. 1-676.

"Simplified Intra Smoothing" by Yunfei Zheng et al., Joint Collaborative Team on Video Coding (JCT-VC) and ITU-T SG16 WP3 and ISO/IEC JTC1/SC29/WG11, 3rd Meeting: Guangzhou, CN, Oct. 2010, JCTV-C234_rl, pp. 1-6.

Davies,"BBC's Response to the Call for Proposals on Video Compression Technology", Joint Collaborative Team on Video Coding (JCT-VC) of ITU-T SG16 WP3 and ISO/IEC JTC1/SC29/WG11, JCTVC-A125, 1st Meeting: Dresden, DE, Apr. 2010, pp. 1-11.

Ichigaya et al.,"Description of video coding technology proposal by NHK and Mitsubishi", Joint Collaborative Team on Video Coding (JCT-VC) of ITU-T SG16 WP3 and ISO/IEC JTC1/SC29/WG11, JCTVC-A122, 1st Meeting: Dresden, DE, Apr. 2010, pp. 1-5, 15-16.

McCann et al.,"Samsung's Response to the Call for Proposals on Video Compression Technology", Joint Collaborative Team on Video Coding (JCT-VC) of ITU-T SG16 WP3 and ISO/IEC JTC1/SC29/WG11, JCTVC-A124, 1st Meeting: Dresden, DE, Apr. 2010, pp. 1-11.

Demin Wang et al. "Improvement of H.26L Intra Block Prediction"—ITU—Telecommunications Standardization Sector—Study Group 16 Question 6—Video Coding Experts Group (VCEG)—Document: VCEG-L09.

Detlev Marpe et al. "H.264/MPEG4-AVC Fidelity Range Extensions:—Tools, Profiles, Performance, and Application Areas"—2005 IEEE.

Kazuo Sugimoto et al. "LUT-based adaptive filtering on intra prediction samples"—Joint Collaborative Team on Video Coding (JCT-VC) of ITU-T SG16 WP3 and ISO/IEC JTC1/SC29/WG11—Document: JCTVC-D109.

Peng Zhang et al. "Multiple Modes Intra-Prediction in Ingra-Coding"—2004 IEEE International Conference on Multimedia and Expo.

"Video Coding Technology Proposal by Fraunhofer HHI" JCT-VC of ITU-T SG16 WP3 and ISO/IEC JTC1/SC29/WG11 1st Meeting: Dresden, DE—Apr. 15, 2010-Apr. 23, 2010; Document: JCTVC-A116.

* cited by examiner

| Intra Prediction Mode Index | Intra Prediction Mode |
|---|---|
| 0 | Vertical Prediction |
| 1 | Horizontal Prediction |
| 2 | Average (DC) Prediction |
| 3~N-1 | Diagonal Prediction |

N: Number Of Intra Prediction Modes

In Case Of $l_i^n = m_i^n = 4$

In Case Of $l_i^n = m_i^n = 4$

In Case Of $l_i^n = m_i^n = 4$

FIG.13

| Intra Prediction Mode Index | Partition Size [pixel] | | | | |
|---|---|---|---|---|---|
| | 4x4 | 8x8 | 16x16 | 32x32 | 64x64 |
| 0 | 0 | 0 | 0 | 0 | 0 |
| 1 | 0 | 0 | 0 | 0 | 0 |
| 2 | 3 | 2 | 1 | 0 | 0 |
| 3 | 2 | 4 | 4 | 0 | 0 |
| 4 | 2 | 4 | 4 | 0 | 0 |
| 5 | 2 | 4 | 4 | 0 | 0 |
| 6 | 0 | 4 | 4 | 0 | 0 |
| 7 | 0 | 4 | 4 | 0 | 0 |
| 8 | 0 | 4 | 4 | 0 | 0 |
| 9 | 0 | 4 | 4 | 0 | 0 |
| 10 | 0 | 0 | 4 | 0 | 0 |
| 11 | 0 | 0 | 4 | 0 | 0 |
| 12 | 0 | 0 | 4 | 0 | 0 |
| 13 | 0 | 0 | 4 | 0 | 0 |
| 14 | 0 | 0 | 4 | 0 | 0 |
| 15 | 0 | 0 | 4 | 0 | 0 |
| 16 | 0 | 0 | 4 | 0 | 0 |
| 17 | 0 | 0 | 4 | 0 | 0 |
| 18 | 0 | 0 | 4 | 0 | 0 |
| 19 | 0 | 0 | 4 | 0 | 0 |
| 20 | 0 | 0 | 4 | 0 | 0 |
| 21 | 0 | 0 | 4 | 0 | 0 |
| 22 | 0 | 0 | 4 | 0 | 0 |
| 23 | 0 | 0 | 4 | 0 | 0 |
| 24 | 0 | 0 | 4 | 0 | 0 |
| 25 | 0 | 0 | 4 | 0 | 0 |
| 26 | 0 | 0 | 4 | 0 | 0 |
| 27 | 0 | 0 | 4 | 0 | 0 |
| 28 | 0 | 0 | 4 | 0 | 0 |
| 29 | 0 | 0 | 4 | 0 | 0 |
| 30 | 0 | 0 | 4 | 0 | 0 |
| 31 | 0 | 0 | 4 | 0 | 0 |
| 32 | 0 | 0 | 4 | 0 | 0 |
| 33 | 0 | 0 | 4 | 0 | 0 |

Region A
Region B
Region D
$P_i^n$
Region C

⊘ Pixel Of Adjacent Encoded Partition

FIG.19

| Intra Prediction Mode Index | Partition Size [pixel] | | | | |
|---|---|---|---|---|---|
| | 4x4 | 8x8 | 16x16 | 32x32 | 64x64 |
| 0 | 0 | 0 | 0 | 0 | 0 |
| 1 | 0 | 0 | 0 | 0 | 0 |
| 2 | 3 | 2 | 1 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 0 | 0 | 0 | 0 | 0 |
| 13 | 0 | 0 | 0 | 0 | 0 |
| 14 | 0 | 0 | 0 | 0 | 0 |
| 15 | 0 | 0 | 0 | 0 | 0 |
| 16 | 0 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |
| 21 | 0 | 0 | 0 | 0 | 0 |
| 22 | 0 | 0 | 0 | 0 | 0 |
| 23 | 0 | 0 | 0 | 0 | 0 |
| 24 | 0 | 0 | 0 | 0 | 0 |
| 25 | 0 | 0 | 0 | 0 | 0 |
| 26 | 0 | 0 | 0 | 0 | 0 |
| 27 | 0 | 0 | 0 | 0 | 0 |
| 28 | 0 | 0 | 0 | 0 | 0 |
| 29 | 0 | 0 | 0 | 0 | 0 |
| 30 | 0 | 0 | 0 | 0 | 0 |
| 31 | 0 | 0 | 0 | 0 | 0 |
| 32 | 0 | 0 | 0 | 0 | 0 |
| 33 | 0 | 0 | 0 | 0 | 0 |

FIG.20

| Intra Prediction Mode Index | Partition Size [pixel] | | | | |
|---|---|---|---|---|---|
| | 4x4 | 8x8 | 16x16 | 32x32 | 64x64 |
| 0 | 0 | 0 | 0 | 0 | 0 |
| 1 | 0 | 0 | 0 | 0 | 0 |
| 2 | 0 | 0 | 0 | 0 | 0 |
| 3 | 1 | 1 | 1 | 1 | 1 |
| 4 | 1 | 1 | 1 | 1 | 1 |
| 5 | 1 | 1 | 1 | 1 | 1 |
| 6 | 0 | 1 | 1 | 1 | 1 |
| 7 | 0 | 1 | 1 | 1 | 1 |
| 8 | 0 | 1 | 1 | 1 | 1 |
| 9 | 0 | 1 | 1 | 1 | 1 |
| 10 | 0 | 0 | 1 | 1 | 1 |
| 11 | 0 | 0 | 1 | 1 | 1 |
| 12 | 0 | 0 | 1 | 1 | 1 |
| 13 | 0 | 0 | 1 | 1 | 1 |
| 14 | 0 | 0 | 1 | 1 | 1 |
| 15 | 0 | 0 | 1 | 1 | 1 |
| 16 | 0 | 0 | 1 | 1 | 1 |
| 17 | 0 | 0 | 1 | 1 | 1 |
| 18 | 0 | 0 | 0 | 1 | 1 |
| 19 | 0 | 0 | 0 | 1 | 1 |
| 20 | 0 | 0 | 0 | 1 | 1 |
| 21 | 0 | 0 | 0 | 1 | 1 |
| 22 | 0 | 0 | 0 | 1 | 1 |
| 23 | 0 | 0 | 0 | 1 | 1 |
| 24 | 0 | 0 | 0 | 1 | 1 |
| 25 | 0 | 0 | 0 | 1 | 1 |
| 26 | 0 | 0 | 0 | 1 | 1 |
| 27 | 0 | 0 | 0 | 1 | 1 |
| 28 | 0 | 0 | 0 | 1 | 1 |
| 29 | 0 | 0 | 0 | 1 | 1 |
| 30 | 0 | 0 | 0 | 1 | 1 |
| 31 | 0 | 0 | 0 | 1 | 1 |
| 32 | 0 | 0 | 0 | 1 | 1 |
| 33 | 0 | 0 | 0 | 1 | 1 |

IMAGE ENCODING DEVICE, IMAGE DECODING DEVICE, IMAGE ENCODING METHOD, AND IMAGE DECODING METHOD FOR GENERATING A PREDICTION IMAGE

This application is a Divisional of application Ser. No. 13/979,357, filed on Jul. 11, 2013, now U.S. Pat. No. 9,299,133, which was filed as PCT International Application No. PCT/JP2012/000061 on Jan. 6, 2012, which claims the benefit under 35 U.S.C. §119(a) to Patent Application No. 2011-004038, filed in Japan on Jan. 12, 2011, all of which are hereby expressly incorporated by reference into the present application.

FIELD OF THE INVENTION

The present invention relates to an image encoding device for and an image encoding method of encoding an image with a high degree of efficiency, and an image decoding device for and an image decoding method of decoding an encoded image with a high degree of efficiency.

BACKGROUND OF THE INVENTION

For example, in accordance with an international standard video encoding method, such as MPEG (Moving Picture Experts Group) or "ITU-T H.26x", an inputted video frame is divided into rectangular blocks (encoding target blocks), a prediction process using an already-encoded image signal is carried out on each encoding target block to generate a prediction image, and orthogonal transformation and a quantization process is carried out on a prediction error signal which is the difference between the encoding target block and the prediction image in units of a block, so that information compression is carried out on the inputted video frame.

For example, in the case of MPEG-4 AVC/H.264 (ISO/IEC 14496-10|ITU-T H.264) which is an international standard method, an intra prediction process from already-encoded adjacent pixels or a motion-compensated prediction process between adjacent frames is carried out (for example, refer to nonpatent reference 1). In the case of MPEG-4 AVC/H.264, one prediction mode can be selected from a plurality of prediction modes for each block in an intra prediction mode of luminance. FIG. 10 is an explanatory drawing showing intra prediction modes in the case of a 4×4 pixel block size for luminance. In FIG. 10, each white circle shows a pixel in a coding block, and each black circle shows a pixel that is used for prediction, and that exists in an already-encoded adjacent block.

In the example shown in FIG. 10, nine modes 0 to 8 are prepared as intra prediction modes, and the mode 2 is the one in which an average prediction is carried out in such a way that each pixel in the target coding block is predicted by using the average of adjacent pixels existing in the upper and left blocks. The modes other than the mode 2 are intra prediction modes in each of which a directional prediction is carried out. The mode 0 is the one in which a vertical prediction is carried out in such a way that adjacent pixels in the upper block are repeatedly replicated to create plural rows of pixels along a vertical direction to generate a prediction image. For example, the mode 0 is selected when the target coding block is a vertically striped pattern. The mode 1 is the one in which a horizontal prediction is carried out in such a way that adjacent pixels in the left block are repeatedly replicated to create plural columns of pixels along a horizontal direction to generate a prediction image. For example, the mode 1 is selected when the target coding block is a horizontally striped pattern. In each of the modes 3 to 8, interpolation pixels running in a predetermined direction (i.e., a direction shown by arrows) are generated by using the adjacent pixels in the upper block or the left block to generate a prediction image.

In this case, the block size for luminance to which an intra prediction is applied can be selected from 4×4 pixels, 8×8 pixels, and 16×16 pixels. In the case of 8×8 pixels, nine intra prediction modes are defined, like in the case of 4×4 pixels. In contrast with this, in the case of 16×16 pixels, four intra prediction modes which are called plane predictions are defined in addition to intra prediction modes associated with an average prediction, a vertical prediction, and a horizontal prediction. Each intra prediction associated with a plane prediction is a mode in which pixels created by carrying out an interpolation in a diagonal direction on the adjacent pixels in the upper block and the adjacent pixels in the left block are provided as predicted values.

In an intra prediction mode in which a directional prediction is carried out, because predicted values are generated along a direction predetermined by the mode, e.g., a direction of 45 degrees, the prediction efficiency increases and the code amount can be reduced when the direction of a boundary (edge) of an object in a block matches the direction shown by the prediction mode. However, a slight displacement may occur between the direction of an edge and the direction shown by the prediction mode, and, even if the direction of an edge in the encoding target block does not match the direction shown by the prediction mode, a large prediction error may occur locally for the simple reason that the edge is slightly distorted (swung, bent, or the like). As a result, the prediction efficiency may drop extremely. In order to prevent such a reduction in the prediction efficiency, when performing an 8×8-pixel directional prediction, a prediction process is carried out to generate a smoothed prediction image by using already-encoded adjacent pixels on which a smoothing process has been carried out, thereby reducing any slight displacement in the prediction direction and prediction errors which occur when a slight distortion occurs in an edge.

RELATED ART DOCUMENT

Nonpatent Reference

Nonpatent reference 1: MPEG-4 AVC (ISO/IEC 14496-10)/ITU-T H.264 standards

SUMMARY OF THE INVENTION

Problems to be Solved by the Invention

Because the conventional image encoding device is constructed as above, the generation of a smoothed prediction image can reduce prediction errors occurring even if a slight displacement occurs in the prediction direction or a slight distortion occurs in an edge. However, according to the technique disclosed in nonpatent reference 1, no smoothing process is carried out on blocks other than 8×8-pixel blocks, and only one possible smoothing process is carried out on even 8×8-pixel blocks. A problem is that also in a block having a size other than 8×8 pixels, a large prediction error actually occurs locally due to a slight mismatch in an edge even when the prediction image has a pattern similar to that of the image to be encoded, and therefore a large reduction occurs in the prediction efficiency. Another problem is that when a quantization parameter which is used when quantizing a prediction error signal, the position of each pixel in a block, the prediction mode, or the like differs between blocks having the same size, a process suitable for reducing local prediction errors differs between the blocks, but only one possible smoothing process is prepared, and therefore prediction errors cannot be sufficiently reduced. A further problem is that when carrying out an average prediction, a prediction signal for a pixel located at a boundary of a block easily becomes discontinuous with those for adjacent encoded pixels because the average of pixels adjacent to the block is defined as each of all the predicted values in the block, while because the image signal generally has a high spatial correlation, a prediction error easily occurs at the block boundary due to the above-mentioned discontinuity.

The present invention is made in order to solve the above-mentioned problems, and it is therefore an object of the present invention to provide an image encoding device, an image decoding device, an image encoding method, and an image decoding method capable of reducing prediction errors which occur locally, thereby being able to improve the image quality.

Means for Solving the Problem

In accordance with an aspect of the present invention, there is provided an image encoding device including: an intra predictor for, when a coding mode corresponding to one of coding blocks into which an inputted image is divided is an intra coding mode, carrying out an intra-frame prediction process on each block which is a unit for prediction of the coding block to generate a prediction image; and an encoder for encoding coding mode information and an intra prediction parameter indicating an average prediction, wherein when the intra predictor carries out the average prediction, the intra predictor carries out a filtering process on target pixels of the intra prediction located at an upper end and a left end of the block, the filtering process using an intermediate prediction value, which is an average value of adjacent pixels of the block, and at least one adjacent pixel of the target pixel, and wherein the intra predictor sets a filter coefficient to ½, associated with the intermediate prediction value for a target pixel at an upper left corner of the block, and sets a filter coefficient to ¼, associated with an adjacent pixel adjacent to an upper side or a left side of the target pixel.

In accordance with another aspect of the present invention, there is provided an image decoding device including: a decoder for decoding coding mode information and an intra prediction parameter; and an intra predictor for, when the coding mode information associated with a coding block is an intra coding mode, carrying out an intra-frame prediction process on each block which is a unit for prediction of the coding block to generate a prediction image, wherein when the intra prediction parameter indicates an average prediction, the intra predictor carries out a filtering process on target pixels of the intra prediction located at an upper end and a left end of the block based on an intermediate prediction value, which is an average value of adjacent pixels of the block, and at least one adjacent pixel of the target pixel, and wherein the intra predictor sets a filter coefficient to ½, associated with the intermediate prediction value for a target pixel at an upper left corner of the block, and sets a filter coefficient to ¼, associated with an adjacent pixel adjacent to an upper side or a left side of the target pixel.

In accordance with another aspect of the present invention, there is provided an image encoding method including: carrying out an intra-frame prediction process on each block which is a unit for prediction of a coding block to generate a prediction image, when a coding mode corresponding to the coding block into which an inputted image is divided is an intra coding mode; and encoding coding mode information and an intra prediction parameter indicating an average prediction, wherein when the average prediction is carried out, a filtering process is carried out on target pixels of the intra prediction located at an upper end and a left end of the block which is a unit for prediction of the coding block, the filtering process using an intermediate prediction value, which is an average value of adjacent pixels of the block, and at least one adjacent pixel of the target pixel, and wherein the filtering process sets a filter coefficient to ½, associated with the intermediate prediction value for a target pixel at an upper left corner of the block, and sets a filter coefficient to ¼, associated with an adjacent pixel adjacent to an upper side or a left side of the target pixel.

In accordance with another aspect of the present invention, there is provided an image decoding method including: decoding coding mode information and an intra prediction parameter; and carrying out an intra-frame prediction process on each block which is a unit for prediction of a coding block to generate a prediction image, when the coding mode information associated with the coding block is an intra coding mode, wherein when the intra prediction parameter indicates an average prediction, a filtering process is carried out on target pixels of the intra prediction located at an upper end and a left end of the block which is a unit for prediction of the coding block, the filtering process using an intermediate prediction value, which is an average value of adjacent pixels of the block, and at least one adjacent pixel of the target pixel, and wherein the filtering process sets a filter coefficient to ½, associated with the intermediate prediction value for a target pixel at an upper left corner of the block, and sets a filter coefficient to ¼, associated with an adjacent pixel adjacent to an upper side or a left side of the target pixel.

In accordance with another aspect of the present invention, there is provided a non-transitory computer readable medium comprising coded data for each of coding blocks, the coded data including: coding mode information causing a decoder to determine a type of coding mode, and causing the decoder to carry out an intra-frame prediction process on each block which is a unit for prediction of a coding block to generate a prediction image, when the coding mode information associated with the coding block indicates an intra coding mode; and an intra prediction parameter causing the decoder to determine a type of intra prediction, wherein when the intra prediction parameter indicates an average prediction, a filtering process is carried out on target pixels of the intra prediction located at an upper end and a left end of the block which is a unit for prediction of the coding block, the filtering process using an intermediate prediction value, which is an average value of adjacent pixels of the block, and at least one adjacent pixel of the target pixel, and wherein the filtering process sets a filter coefficient to ½, associated with the intermediate prediction value for a target pixel at an upper left corner of the block, and sets a filter coefficient to ¼, associated with an adjacent pixel adjacent to an upper side or a left side of the target pixel.

Advantages of the Invention

Because the image encoding device in accordance with an aspect of the present invention is constructed in such a way that when carrying out an average prediction, an intra predictor carries out a filtering process on target pixels of the intra prediction located at an upper end and a left end of the block, the filtering process using an intermediate prediction value, which is an average value of adjacent pixels of the block, and at least one adjacent pixel of the target pixel and the intra predictor sets a filter coefficient to ½, associated with the intermediate prediction value for a target pixel at an upper left corner of the block, and sets a filter coefficient to ¼, associated with an adjacent pixel adjacent to an upper side or a left side of the target pixel, there is provided an advantage of being able to reduce prediction errors occurring locally, thereby being able to improve the image quality.

BRIEF DESCRIPTION OF THE FIGURES

FIG. 13 is an explanatory drawing showing an example of a table for determining which filter is to be used for each combination of an intra prediction mode index and a partition size;

FIG. 19 is an explanatory drawing showing another example of the table, which differs from that shown in FIG. 13, for determining which filter is to be used for each combination of an intra prediction mode index and a partition size; and FIG. 20 is an explanatory drawing showing an example of a table for determining whether or not to carry out a smoothing process on reference pixels at the time of generating an intermediate prediction image for each combination of an intra prediction mode index and a partition size.

EMBODIMENTS OF THE INVENTION

Figure 1:
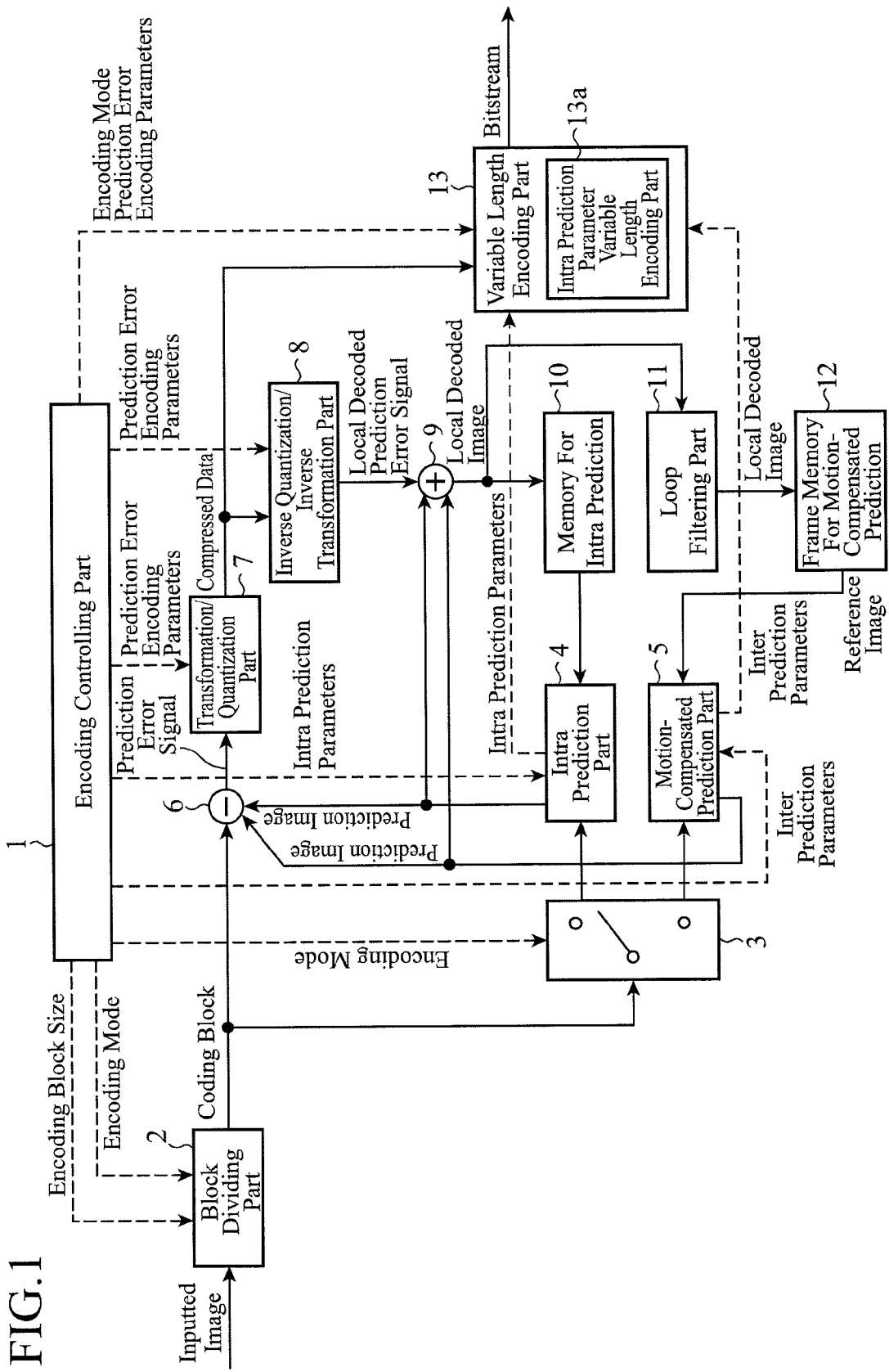
FIG. 1 is a block diagram showing a moving image encoding device in accordance with Embodiment 1 of the present invention.

Hereafter, in order to explain this invention in greater detail, the preferred embodiments of the present invention will be described with reference to the accompanying drawings.

Embodiment 1

In this Embodiment 1, a moving image encoding device that inputs each frame image of a video, carries out an intra prediction process from already-encoded adjacent pixels or a motion-compensated prediction process between adjacent frames to generate a prediction image, carries out a compression process according to orthogonal transformation and quantization on a prediction error signal which is a difference image between the prediction image and a frame image, and, after that, carries out variable length encoding to generate a bitstream, and a moving image decoding device that decodes the bitstream outputted from the moving image encoding device will be explained.

The moving image encoding device in accordance with this Embodiment 1 is characterized in that the moving image encoding device adapts itself to a local change of a video signal in space and time directions to divide the video signal into regions of various sizes, and carries out intra-frame and inter-frame adaptive encoding. In general, a video signal has a characteristic of its complexity varying locally in space and time. There can be a case in which a pattern having a uniform signal characteristic in a relatively large image region, such as a sky image or a wall image, or a pattern having a complicated texture pattern in a small image region, such as a person image or a picture including a fine texture, also coexists on a certain video frame from the viewpoint of space. Also from the viewpoint of time, a relatively large image area, such as a sky image or a wall image, has a small local change in a time direction in its pattern, while an image of a moving person or object has a larger temporal change because its outline has a movement of a rigid body and a movement of a non-rigid body with respect to time.

Although a process of generating a prediction error signal having small signal power and small entropy by using temporal and spatial prediction, thereby reducing the whole code amount, is carried out in the encoding process, the code amount of parameters used for the prediction can be reduced as long as the parameters can be applied uniformly to as large an image signal region as possible. On the other hand, because the amount of errors occurring in the prediction increases when the same prediction parameters are applied to an image signal pattern having a large change in time and space, the code amount of the prediction error signal cannot be reduced. Therefore, it is desirable to reduce the size of a region which is subjected to the prediction process when performing the prediction process on an image signal pattern having a large change in time and space, thereby reducing the electric power and entropy of the prediction error signal even though the data volume of the parameters which are used for the prediction is increased. In order to carry out encoding which is adapted for such the typical characteristics of a video signal, the moving image encoding device in accordance with this Embodiment 1 hierarchically divides each region having a predetermined maximum block size of the video signal into blocks, and carries out the prediction process and the encoding process of encoding a prediction error on each of the blocks into which each region is divided.

A video signal which is to be processed by the moving image encoding device in accordance with this Embodiment 1 can be an arbitrary video signal in which each video frame consists of a series of digital samples (pixels) in two dimensions, horizontal and vertical, such as a YUV signal which consists of a luminance signal and two color difference signals, a color video image signal in arbitrary color space, such as an RGB signal, outputted from a digital image sensor, a monochrome image signal, or an infrared image signal. The gradation of each pixel can be an 8-bit, 10-bit, or 12-bit one. In the following explanation, the inputted video signal is a YUV signal unless otherwise specified. It is further assumed that the two color difference components U and V are signals having a 4:2:0 format which are sub-sampled with respect to the luminance component Y. A data unit to be processed which corresponds to each frame of the video signal is referred to as a "picture." In this Embodiment 1, a "picture" is explained as a video frame signal on which progressive scanning has been carried out. When the video signal is an interlaced signal, a "picture" can be alternatively a field image signal which is a unit which constructs a video frame.

FIG. 1 is a block diagram showing a moving image encoding device in accordance with Embodiment 1 of the present invention. Referring to FIG. 1, an encoding controlling part 1 carries out a process of determining a maximum size of each of coding blocks which is a unit to be processed at a time when an intra prediction process (intra-frame prediction process) or a motion-compensated prediction process (inter-frame prediction process) is carried out, and also determining an upper limit on the number of hierarchical layers, i.e., a maximum hierarchy depth in a hierarchy in which each of the coding blocks having the maximum size is hierarchically divided into blocks. The encoding controlling part 1 also carries out a process of selecting a coding mode suitable for each of the coding blocks into which each coding block having the maximum size is divided hierarchically from one or more available coding modes (one or more intra coding modes and one or more inter coding modes). The encoding controlling part 1 further carries out a process of determining a quantization parameter and a transform block size which are used when a difference image is compressed for each coding block, and also determining intra prediction parameters or inter prediction parameters which are used when a prediction process is carried out for each coding block. The quantization parameter and the transform block size are included in prediction error encoding parameters, and these prediction error encoding parameters are outputted to a transformation/quantization part 7, an inverse quantization/inverse transformation part 8, a variable length encoding part 13, and so on. The encoding controlling part 1 constructs an encoding controlling unit.

A block dividing part 2 carries out a process of, when receiving a video signal showing an inputted image, dividing the inputted image shown by the video signal into coding blocks each having the maximum size determined by the encoding controlling part 1, and also dividing each of the coding blocks into blocks hierarchically until the number of hierarchical layers reaches the upper limit on the number of hierarchical layers which is determined by the encoding controlling part 1. The block dividing part 2 constructs a block dividing unit. A selection switch 3 carries out a process of, when the coding mode selected by the encoding controlling part 1 for the coding block, which is generated through the division by the block dividing part 2, is an intra coding mode, outputting the coding block to an intra prediction part 4, and, when the coding mode selected by the encoding controlling part 1 for the coding block, which is generated through the division by the block dividing part 2, is an inter coding mode, outputting the coding block to a motion-compensated prediction part 5.

The intra prediction part 4 carries out a process of, when receiving the coding block, which is generated through the division by the block dividing part 2, from the selection switch 3, carrying out an intra prediction process on the coding block to generate a prediction image for each partition by using an already-encoded image signal in the frame on the basis of the intra prediction parameter outputted thereto from the encoding controlling part 1. After generating the above-mentioned prediction image, the intra prediction part 4 selects a filter from one or more filters which are prepared in advance according to the states of the various parameters which must be known when the moving image decoding device generates the same prediction image as the above-mentioned prediction image, carries out a filtering process on the above-mentioned prediction image by using the filter, and outputs the prediction image on which the intra prediction part has carried out the filtering process to a subtracting part 6 and an adding part 9. Concretely, the intra prediction part uniquely determines a filter according to the state of at least one of the following four parameters which are provided as the above-mentioned various parameters:
Parameter (1)
The block size of the above-mentioned prediction image
Parameter (2)
The quantization parameter determined by the encoding controlling part 1
Parameter (3)
The distance between the already-encoded image signal in the frame which is used when generating the prediction image and a target pixel to be filtered
Parameter (4)
The intra prediction parameter determined by the encoding controlling part 1
An intra prediction unit is comprised of the selection switch 3 and the intra prediction part 4.

The motion-compensated prediction part 5 carries out a process of, when an inter coding mode is selected by the encoding controlling part 1 as a coding mode suitable for the coding block, which is generated through the division by the block dividing part 2, performing a motion-compensated prediction process on the coding block to generate a prediction image by using one or more frames of reference images stored in a motion-compensated prediction frame memory 12 on the basis of the inter prediction parameters outputted thereto from the encoding controlling part 1. A motion-compensated prediction unit is comprised of the selection switch 3 and the motion-compensated prediction part 5.

The subtracting part 6 carries out a process of subtracting the prediction image generated by the intra prediction part 4 or the motion-compensated prediction part 5 from the coding block, which is generated through the division by the block dividing part 2, to generate a difference image (=the coding block−the prediction image). The subtracting part 6 constructs a difference image generating unit. The transformation/quantization part 7 carries out a process of performing a transformation process (e.g., a DCT (discrete cosine transform) or an orthogonal transformation process, such as a KL transform, in which bases are designed for a specific learning sequence in advance) on the difference signal generated by the subtracting part 6 in units of a block having a transform block size included in the prediction error encoding parameters outputted thereto from the encoding controlling part 1, and also quantizing the transform coefficients of the difference image by using a quantization parameter included in the prediction error encoding parameters to output the transform coefficients quantized thereby as compressed data of the difference image. The transformation/quantization part 7 constructs an image compression unit.

The inverse quantization/inverse transformation part 8 carries out, a process of inverse-quantizing the compressed data outputted thereto from the transformation/quantization part 7 by using the quantization parameter included in the prediction error encoding parameters outputted thereto from the encoding controlling part 1, and performing an inverse transformation process (e.g., an inverse DCT (inverse discrete cosine transform) or an inverse transformation process such as an inverse KL transform) on the compressed data inverse-quantized thereby in units of a block having the transform block size included in the prediction error encoding parameters to output the compressed data on which the inverse quantization/inverse transformation part has carried out the inverse transformation process as a local decoded prediction error signal.

The adding part 9 carries out a process of adding the local decoded prediction error signal outputted thereto from the inverse quantization/inverse transformation part 8 and the prediction signal showing the prediction image generated by the intra prediction part 4 or the motion-compensated prediction part 5 to generate a local decoded image signal showing a local decoded image. A memory 10 for intra prediction is a recording medium, such as a RAM, for storing the local decoded image shown by the local decoded image signal generated by the adding part 9 as an image which the intra prediction part 4 will use when performing the intra prediction process the next time.

A loop filter part 11 carries out a process of compensating for an encoding distortion included in the local decoded image signal generated by the adding part 9, and outputting the local decoded image shown by the local decoded image signal on which the loop filter part has carried out the encoding distortion compensation to a motion-compensated prediction frame memory 12 as a reference image. The motion-compensated prediction frame memory 12 is a recording medium, such as a RAM, for storing the local decoded image on which the loop filter part 11 has carried out the filtering process as a reference image which the motion-compensated prediction part 5 will use when performing the motion-compensated prediction process the next time.

The variable length encoding part 13 carries out a process of variable-length-encoding the compressed data outputted thereto from the transformation/quantization part 7, the coding mode and the prediction error encoding parameters which are outputted thereto from the encoding controlling part 1, and the intra prediction parameters outputted thereto from the intra prediction part 4 or the inter prediction parameters outputted thereto from the motion-compensated prediction part 5 to generate a bitstream into which encoded data of the compressed data, encoded data of the coding mode, encoded data of the prediction error encoding parameters, and encoded data of the intra prediction parameters or the inter prediction parameters are multiplexed. The variable length encoding part 13 constructs a variable length encoding unit.

Figure 2:
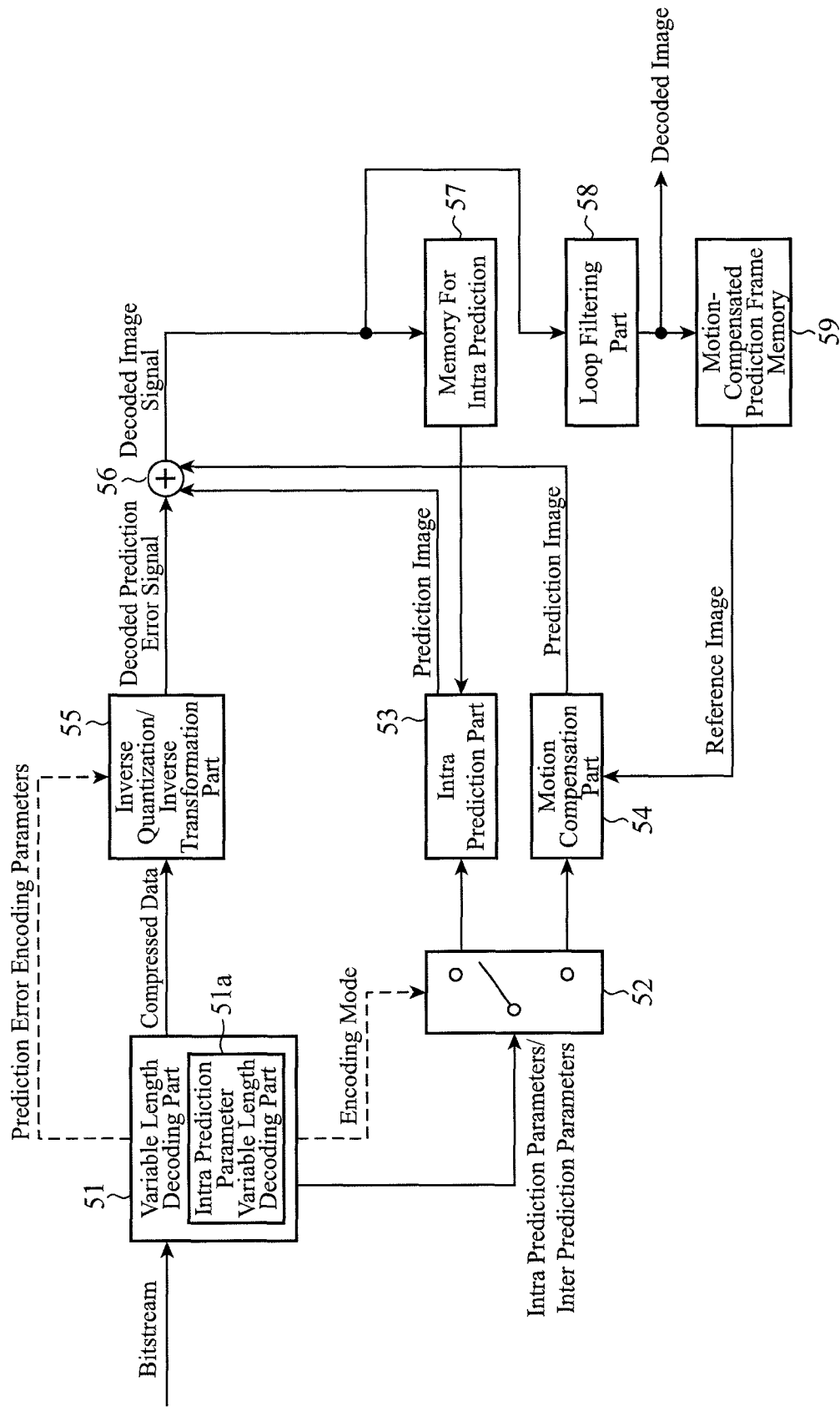
FIG. 2 is a block diagram showing a moving image decoding device in accordance with Embodiment 1 of the present invention.

FIG. 2 is a block diagram showing the moving image decoding device in accordance with Embodiment 1 of the present invention. Referring to FIG. 2, a variable length decoding part 51 carries out a process of variable-length-decoding the encoded data multiplexed into the bitstream to acquire the compressed data, the coding mode, the prediction error encoding parameters, and the intra prediction parameters or the inter prediction parameters, which are associated with each coding block into which each frame of the video is hierarchically divided, and outputting the compressed data and the prediction error encoding parameters to an inverse quantization/inverse transformation part 55, and also outputting the coding mode and the intra prediction parameters or the inter prediction parameters to a selection switch 52. The variable length decoding part 51 constructs a variable length decoding unit.

The selection switch 52 carries out a process of, when the coding mode associated with the coding block, which is outputted from the variable length decoding part 51, is an intra coding mode, outputting the intra prediction parameters outputted thereto from the variable length decoding part 51 to an intra prediction part 53, and, when the coding mode is an inter coding mode, outputting the inter prediction parameters outputted thereto from the variable length decoding part 51 to a motion-compensated prediction part 54.

The intra prediction part 53 carries out a process of performing an intra-frame prediction process on the coding block to generate a prediction image for each partition by using an already-decoded image signal in the frame on the basis of the intra prediction parameter outputted thereto from the selection switch 52. After generating the above-mentioned prediction image, the intra prediction part 53 selects a filter from one or more filters which are prepared in advance according to the states of the various parameters which are known when generating the above-mentioned prediction image, carries out a filtering process on the above-mentioned prediction image by using the filter, and outputs the prediction image on which the intra prediction part has carried out the filtering process to an adding part 56. Concretely, the intra prediction part uniquely determines a filter according to the state of at least one of the following four parameters which are provided as the above-mentioned various parameters. The intra prediction part predetermines one or more parameters to be used which are the same as the previously-mentioned one or more parameters which are used by the moving image encoding device. More specifically, the parameters which the moving image encoding device uses and those which the moving image decoding device uses are made to be the same as each other in such a way that when the intra prediction part 4 carries out the filtering process by using the parameters (1) and (4) in the moving image encoding device, the intra prediction part 53 similarly carries out the filtering by using the parameters (1) and (4) in the moving image decoding device, for example.
Parameter (1)
The block size of the above-mentioned prediction image
Parameter (2)
The quantization parameter variable-length-decoded by the variable length decoding part 51
Parameter (3)
The distance between the already-decoded image signal in the frame which is used when generating the prediction image and a target pixel to be filtered
Parameter (4)
The intra prediction parameter variable-length-decoded by the variable length decoding part 51
An intra prediction unit is comprised of the selection switch 52 and the intra prediction part 53.

The motion-compensated prediction part 54 carries out a process of performing a motion-compensated prediction process on the coding block to generate a prediction image by using one or more frames of reference images stored in a motion-compensated prediction frame memory 59 on the basis of the inter prediction parameters outputted thereto from the selection switch 52. A motion-compensated prediction unit is comprised of the selection switch 52 and the motion-compensated prediction part 54.

The inverse quantization/inverse transformation part 55 carries out a process of inverse-quantizing the compressed data associated with the coding block, which is outputted thereto from the variable length decoding part 51, by using the quantization parameter included in the prediction error encoding parameters outputted thereto from the variable length decoding part 51, and performing an inverse transformation process (e.g., an inverse DCT (inverse discrete cosine transform) or an inverse transformation process such as an inverse KL transform) on the compressed data inverse-quantized thereby in units of a block having the transform block size included in the prediction error encoding parameters, and outputting the compressed data on which the inverse quantization/inverse transformation part has carried out the inverse transformation process as a decoded prediction error signal (signal showing a pre-compressed difference image). The inverse quantization/inverse transformation part 55 constructs a difference image generating unit.

The adding part 56 carries out a process of adding the decoded prediction error signal outputted thereto from the inverse quantization/inverse transformation part 55 and the prediction signal showing the prediction image generated by the intra prediction part 53 or the motion-compensated prediction part 54 to generate a decoded image signal showing a decoded image. The adding part 56 constructs a decoded image generating unit. A memory 57 for intra prediction is a recording medium, such as a RAM, for storing the decoded image shown by the decoded image signal generated by the adding part 56 as an image which the intra prediction part 53 will use when performing the intra prediction process the next time.

A loop filter part 58 carries out a process of compensating for an encoding distortion included in the decoded image signal generated by the adding part 56, and outputting the decoded image shown by the decoded image signal on which the loop filter part performs the encoding distortion compensation to a motion-compensated prediction frame memory 59 as a reference image. The motion-compensated prediction frame memory 59 is a recording medium, such as a RAM, for storing the decoded image on which the loop filter part 58 performs the filtering process as a reference image which the motion-compensated prediction part 54 will use when performing the motion-compensated prediction process the next time.

Figure 3:
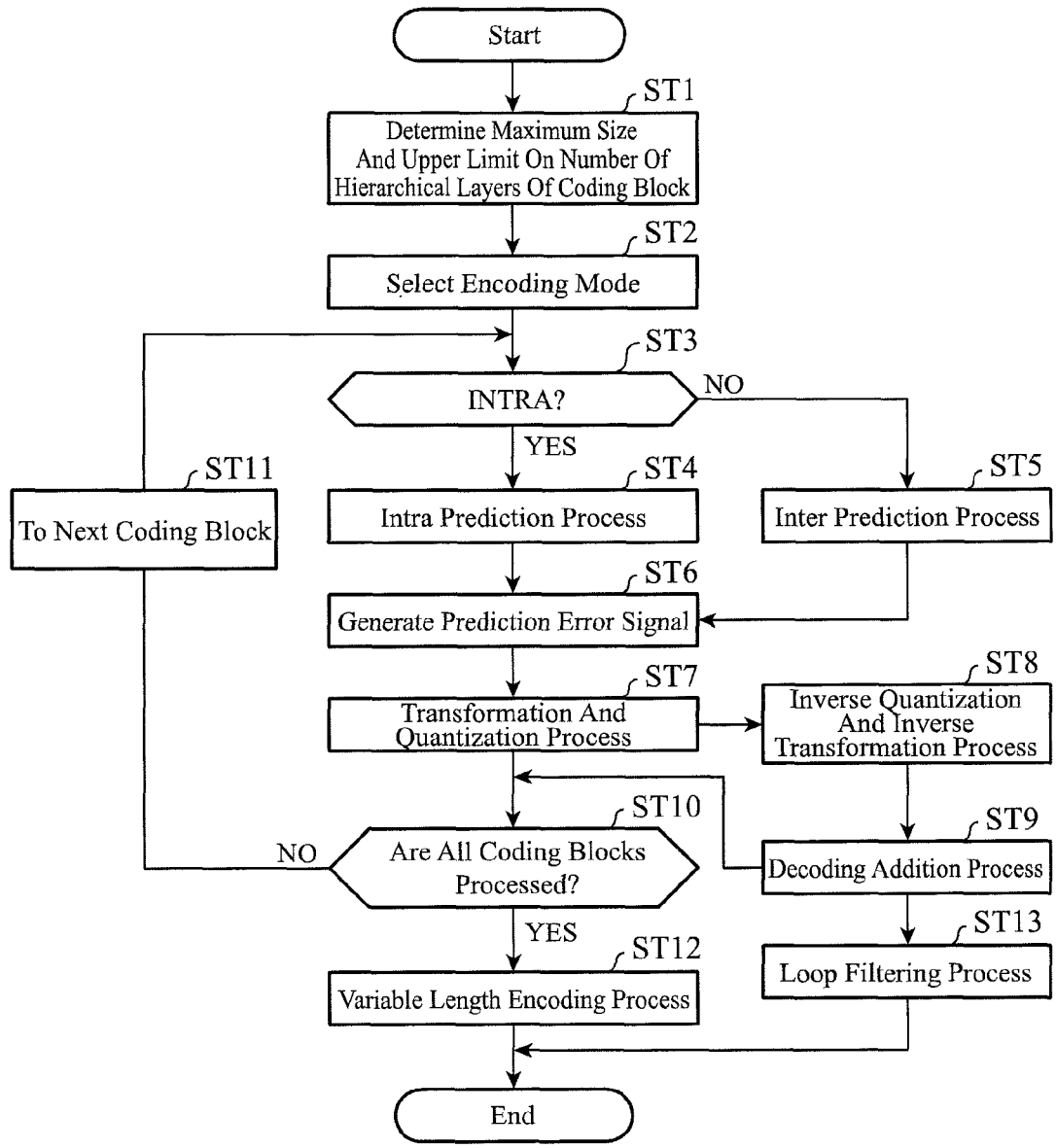
FIG. 3 is a flow chart showing processing carried out by the moving image encoding device in accordance with Embodiment 1 of the present invention.

In the example shown in FIG. 1, the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13, which are the components of the moving image encoding device, can consist of pieces of hardware for exclusive use (e.g., integrated circuits in each of which a CPU is mounted, one chip microcomputers, or the like), respectively. As an alternative, the moving image encoding device can consist of a computer, and a program in which the processes carried out by the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13 are described can be stored in a memory of the computer and the CPU of the computer can be made to execute the program stored in the memory. FIG. 3 is a flow chart showing the processing carried out by the moving image encoding device in accordance with Embodiment 1 of the present invention.

Figure 4:
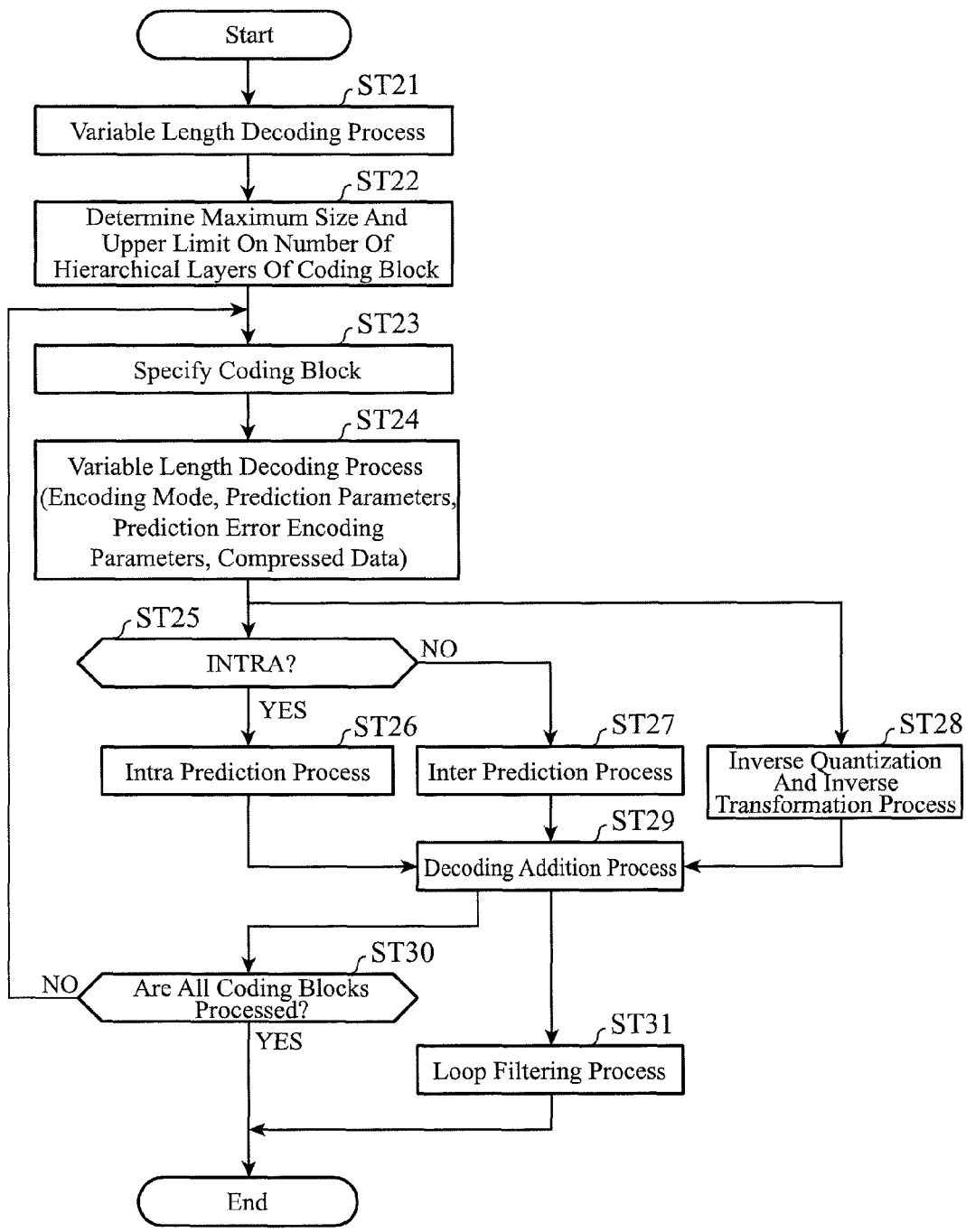
FIG. 4 is a flow chart showing processing carried out by the moving image decoding device in accordance with Embodiment 1 of the present invention.

In the example shown in FIG. 2, the variable length decoding part 51, the selection switch 52, the intra prediction part 53, the motion-compensated prediction part 54, the inverse quantization/inverse transformation part 55, the adding part 56, and the loop filter part 58, which are the components of the moving image decoding device, can consist of pieces of hardware for exclusive use (e.g., integrated circuits in each of which a CPU is mounted, one chip microcomputers, or the like), respectively. As an alternative, the moving image decoding device can consist of a computer, and a program in which the processes carried out by the variable length decoding part 51, the selection switch 52, the intra prediction part 53, the motion-compensated prediction part 54, the inverse quantization/inverse transformation part 55, the adding part 56, and the loop filter part 58 are described can be stored in a memory of the computer and the CPU of the computer can be made to execute the program stored in the memory. FIG. 4 is a flow chart showing the processing carried out by the moving image decoding device in accordance with Embodiment 1 of the present invention.

Next, the operation of the moving image encoding device and that of the moving image decoding device will be explained. First, the processing carried out by the moving image encoding device shown in FIG. 1 will be explained. First, the encoding controlling part 1 determines a maximum size of each of coding blocks which is a unit to be processed at a time when an intra prediction process (intra-frame prediction process) or a motion-compensated prediction process (inter-frame prediction process) is carried out, and also determines an upper limit on the number of hierarchical layers in a hierarchy in which each of the coding blocks having the maximum size is hierarchically divided into blocks (step ST1 of FIG. 3).

As a method of determining the maximum size of each of coding blocks, for example, there is considered a method of determining a maximum size for all the pictures according to the resolution of the inputted image. Further, there can be considered a method of quantifying a variation in the complexity of a local movement of the inputted image as a parameter and then determining a small size for a picture having a large and vigorous movement while determining a large size for a picture having a small movement. As a method of determining the upper limit on the number of hierarchical layers, for example, there can be considered a method of increasing the depth of the hierarchy, i.e., the number of hierarchical layers to make it possible to detect a finer movement as the inputted image has a larger and more vigorous movement, or decreasing the depth of the hierarchy, i.e., the number of hierarchical layers as the inputted image has a smaller movement.

The encoding controlling part 1 also selects a coding mode suitable for each of the coding blocks into which each coding block having the maximum size is divided hierarchically from one or more available coding modes (M intra coding modes and N inter coding modes) (step ST2). Although a detailed explanation of the selection method of selecting a coding mode for use in the encoding controlling part 1 will be omitted because the selection method is a known technique, there is a method of carrying out an encoding process on the coding block by using an arbitrary available coding mode to examine the encoding efficiency and select a coding mode having the highest level of encoding efficiency from among a plurality of available coding modes, for example.

The encoding controlling part 1 further determines a quantization parameter and a transform block size which are used when a difference image is compressed for each coding block, and also determines intra prediction parameters or inter prediction parameters which are used when a prediction process is carried out. The encoding controlling part 1 outputs prediction error encoding parameters including the quantization parameter and the transform block size to the transformation/quantization part 7, the inverse quantization/inverse transformation part 8, and the variable length encoding part 13. The encoding controlling part also outputs the prediction error encoding parameters to the intra prediction part 4 as needed.

Figure 5:
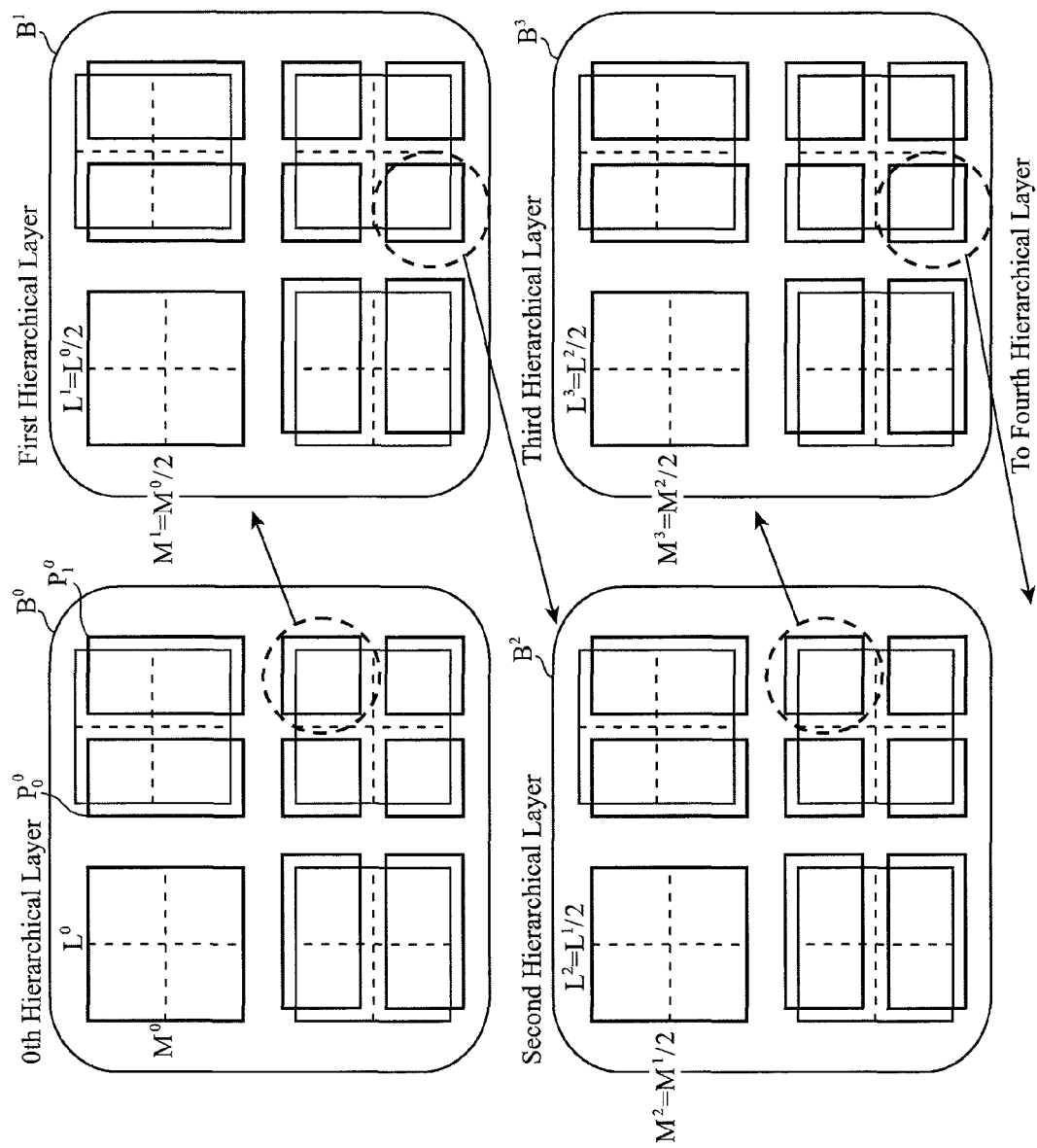
FIG. 5 is an explanatory drawing showing a state in which each coding block having a maximum size is hierarchically divided into a plurality of coding blocks.

When receiving the video signal showing the inputted image, the block dividing part 2 divides the inputted image shown by the video signal into coding blocks each having the maximum size determined by the encoding controlling part 1, and also divides each of the coding blocks into blocks hierarchically until the number of hierarchical layers reaches the upper limit on the number of hierarchical layers which is determined by the encoding controlling part 1. FIG. 5 is an explanatory drawing showing a state in which each coding block having the maximum size is hierarchically divided into a plurality of coding blocks. In the example of FIG. 5, each coding block having the maximum size is a coding block $B^0$ in the 0th hierarchical layer, and its luminance component has a size of $(L^0, M^0)$. Further, in the example of FIG. 5, by carrying out the hierarchical division with this coding block $B^0$ having the maximum size being set as a starting point until the depth of the hierarchy reaches a predetermined depth which is set separately according to a quadtree structure, coding blocks $B^n$ can be acquired.

At the depth of n, each coding block $B^n$ is an image region having a size of $(L^n, M^n)$. Although $L^n$ can be the same as or differ from $M^n$, the case of $L^n=M^n$ is shown in the example of FIG. 5. Hereafter, the size of each coding block $B^n$ is defined as the size of $(L^n, M^n)$ in the luminance component of the coding block $B^n$.

Because the block dividing part 2 carries out a quadtree division, $(L^{n+1}, M^{n+1})=(L^n/2, M^n/2)$ is always established. In the case of a color video image signal (4:4:4 format) in which all the color components have the same sample number, such as an RGB signal, all the color components have a size of $(L^n, M^n)$, while in the case of handling a 4:2:0 format, a corresponding color difference component has a coding block size of $(L^n/2, M^n/2)$. Hereafter, a coding mode selectable for each coding block $B^n$ in the nth hierarchical layer is expressed as $m(B^n)$.

In the case of a color video signal which consists of a plurality of color components, the coding mode $m(B^n)$ can be formed in such a way that an individual mode is used for each color component. Hereafter, an explanation will be made by assuming that the coding mode $m(B^n)$ indicates the one for the luminance component of each coding block having a 4:2:0 format in a YUV signal unless otherwise specified. The coding mode $m(B^n)$ can be one of one or more intra coding modes (generically referred to as "INTRA") or one or more inter coding modes (generically referred to as "INTER"), and the encoding controlling part 1 selects, as the coding mode $m(B^n)$, a coding mode with the highest degree of encoding efficiency for each coding block $B^n$ from among all the coding modes available in the picture currently being processed or a subset of these coding modes, as mentioned above.

Each coding block $B^n$ is further divided into one or more prediction units (partitions) by the block dividing part, as shown in FIG. 5. Hereafter, each partition belonging to each coding block $B^n$ is expressed as $P_i^n$ (i shows a partition number in the nth hierarchical layer). How the division of each coding block $B^n$ into partitions $P_i^n$ belonging to the coding block $B^n$ is carried out is included as information in the coding mode $m(B^n)$. While the prediction process is carried out on each of all the partitions $P_i^n$ according to the coding mode $m(B^n)$, an individual prediction parameter can be selected for each partition $P_i^n$.

Figures 6A, 6B:
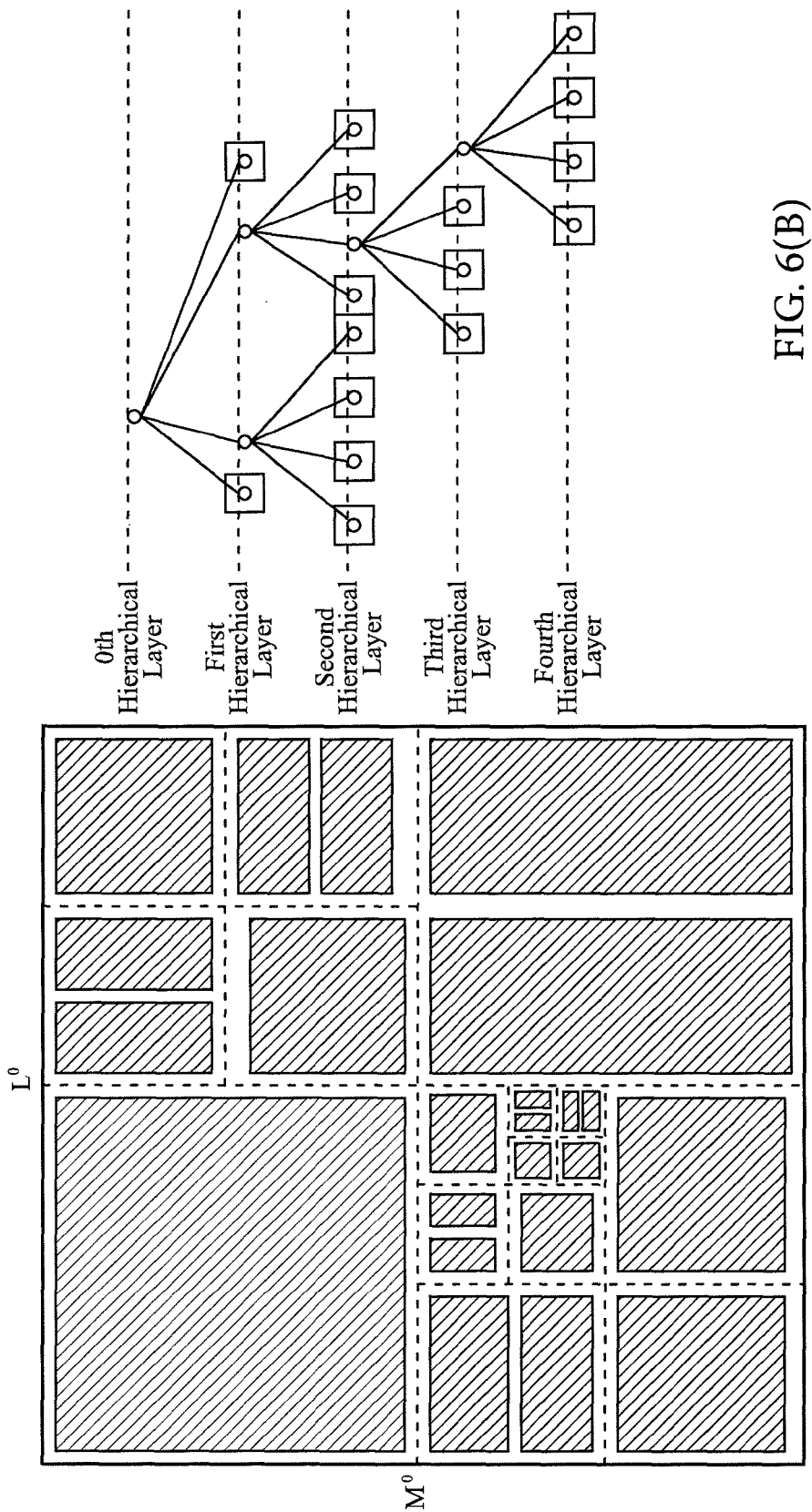
FIG. 6(A) is an explanatory drawing showing a distribution of partitions into which a block to encoded is divided.
FIG. 6(B) is an explanatory drawing showing a state in which a coding mode m(B$^n$) is assigned to each of the partitions after a hierarchical layer division is performed by using a quadtree graph.

The encoding controlling part 1 produces such a block division state as shown in, for example, FIG. 6 for a coding block having the maximum size, and then determines coding blocks $B^n$. Hatched portions shown in FIG. 6(a) show a distribution of partitions into which the coding block having the maximum size is divided, and FIG. 6(b) shows a situation in which coding modes $m(B^n)$ are respectively assigned to the partitions generated through the hierarchical layer division by using a quadtree graph. Each node enclosed by a square symbol shown in FIG. 6(b) is the one (coding block $B^n$) to which a coding mode $m(B^n)$ is assigned.

When the encoding controlling part 1 selects an optimal coding mode $m(B^n)$ for each partition $P_i^n$ of each coding block $B^n$, and the coding mode $m(B^n)$ is an intra coding mode (step ST3), the selection switch 3 outputs the partition $P_i^n$ of the coding block $B^n$, which is generated through the division by the block dividing part 2, to the intra prediction part 4. In contrast, when the coding mode $m(B^n)$ is an inter coding mode (step ST3), the selection switch outputs the partition $P_i^n$ of the coding block $B^n$, which is generated through the division by the block dividing part 2, to the motion-compensated prediction part 5.

When receiving the partition $P_i^n$ of the coding block $B^n$ from the selection switch 3, the intra prediction part 4 carries out an intra prediction process on the partition $P_i^n$ of the coding block $B^n$ to generate an intra prediction image $P_i^n$ by using an already-encoded image signal in the frame on the basis of the intra prediction parameter outputted thereto from the encoding controlling part 1 (step ST4). After generating the above-mentioned intra prediction image $P_i^n$, the intra prediction part 4 selects a filter from the one or more filters which are prepared in advance according to the states of the various parameters which must be known when the moving image decoding device generates the same prediction image as the above-mentioned intra prediction image $P_i^n$, and carries out a filtering process on the intra prediction image $P_i^n$ by using the filter. After carrying out the filtering process on the intra prediction image $P_i^n$, the intra prediction part 4 outputs the intra prediction image $P_i^n$ on which the intra prediction part has carried out the filtering process to the subtracting part 6 and the adding part 9. In order to enable the moving image decoding device shown in FIG. 2 to also be able to generate the same intra prediction image $P_i^n$, the intra prediction part outputs the intra prediction parameters to the variable length encoding part 13. The outline of the process carried out by the intra prediction part 4 is as mentioned above, and the details of this process will be mentioned below.

When receiving the partition $P_i^n$ of the coding block $B^n$ from the selection switch 3, the motion-compensated prediction part 5 carries out a motion-compensated prediction process on the partition $P_i^n$ of the coding block $B^n$ to generate an inter prediction image $P_i^n$ by using one or more frames of reference images stored in the motion-compensated prediction frame memory 12 on the basis of the inter prediction parameters outputted thereto from the encoding controlling part 1 (step ST5). Because a technology of carrying out a motion-compensated prediction process to generate a prediction image is known, the detailed explanation of this technology will be omitted hereafter.

After the intra prediction part 4 or the motion-compensated prediction part 5 generates the prediction image (an intra prediction image $P_i^n$ or an inter prediction image $P_i^n$), the subtracting part 6 subtracts the prediction image (the intra prediction image $P_i^n$ or the inter prediction image $P_i^n$) generated by the intra prediction part 4 or the motion-compensated prediction part 5 from the partition $P_i^n$ of the coding block which is generated through the division by the block dividing part 2, to generate a difference image, and outputs a prediction error signal $c_i^n$ showing the difference image to the transformation/quantization part 7 (step ST6).

When receiving the prediction error signal $c_i^n$ showing the difference image from the subtracting part 6, the transformation/quantization part 7 carries out a transformation process (e.g., a DCT (discrete cosine transform) or an orthogonal transformation process, such as a KL transform, in which bases are designed for a specific learning sequence in advance) on the difference image in units of a block having the transform block size included in the prediction error encoding parameters outputted thereto from the encoding controlling part 1, and quantizes the transform coefficients of the difference image by using the quantization parameter included in the prediction error encoding parameters and outputs the transform coefficients quantized thereby to the inverse quantization/inverse transformation part 8 and the variable length encoding part 13 as compressed data of the difference image (step ST7).

When receiving the compressed data of the difference image from the transformation/quantization part 7, the inverse quantization/inverse transformation part 8 inverse-quantizes the compressed data of the difference image by using the quantization parameter included in the prediction error encoding parameters outputted thereto from the encoding controlling part 1, performs an inverse transformation process (e.g., an inverse DCT (inverse discrete cosine transform) or an inverse transformation process such as an inverse KL transform) on the compressed data inverse-quantized thereby in units of a block having the transform block size included in the prediction error encoding parameters, and outputs the compressed data on which the inverse quantization/inverse transformation part has carried out the inverse transformation process to the adding part 9 as a local decoded prediction error signal $e_i^n$ hat ("^" attached to an alphabetical letter is expressed by hat for reasons of the restrictions on electronic applications) (step ST8).

When receiving the local decoded prediction error signal $c_i^n$ hat from the inverse quantization/inverse transformation part 8, the adding part 9 adds the local decoded prediction error signal $e_i^n$ hat and the prediction signal showing the prediction image (the intra prediction image $P_i^n$ or the inter prediction image $P_i^n$) generated by the intra prediction part 4 or the motion-compensated prediction part 5 to generate a local decoded image which is a local decoded partition image $P_i^n$ hat or a local decoded coding block image which is a group of local decoded partition images (step ST9). After generating the local decoded image, the adding part 9 stores a local decoded image signal showing the local decoded image in the memory 10 for intra prediction and also outputs the local decoded image signal to the loop filter part 11.

The moving image encoding device repeatedly carries out the processes of steps ST3 to ST9 until the moving image encoding device completes the processing on all the coding blocks $B^n$ into which the inputted image is divided hierarchically, and, when completing the processing on all the coding blocks $B^n$, shifts to a process of step ST12 (steps ST10 and ST11).

The variable length encoding part 13 entropy-encodes the compressed data outputted thereto from the transformation/quantization part 7, the coding mode (including the information showing the state of the division into the coding blocks) and the prediction error encoding parameters, which are outputted thereto from the encoding controlling part 1, and the intra prediction parameters outputted thereto from the intra prediction part 4 or the inter prediction parameters outputted thereto from the motion-compensated prediction part 5. The variable length encoding part 13 multiplexes encoded data which are the encoded results of the entropy encoding of the compressed data, the coding mode, the prediction error encoding parameters, and the intra prediction parameters or the inter prediction parameters to generate a bitstream (step ST12).

When receiving the local decoded image signal from the adding part 9, the loop filter part 11 compensates for an encoding distortion included in the local decoded image signal, and stores the local decoded image shown by the local decoded image signal on which the loop filter part performs the encoding distortion compensation in the motion-compensated prediction frame memory 12 as a reference image (step ST13). The loop filter part 11 can carry out the filtering process for each coding block having the maximum size of the local decoded image signal outputted thereto from the adding part 9 or for each coding block of the local decoded image signal, or for each unit which is a combination of a plurality of coding blocks each having the maximum size. As an alternative, after one picture of local decoded image signals is outputted, the loop filter part can carry out the filtering process on the picture of local decoded image signals at a time.

Figure 7:
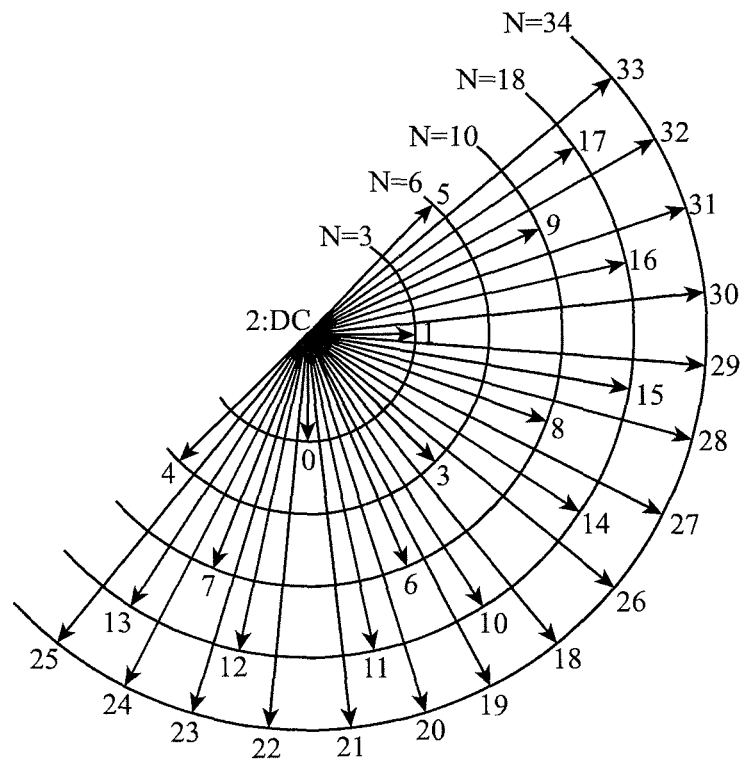
FIG. 7 is an explanatory drawing showing an example of intra prediction parameters (intra prediction modes) which can be selected for each partition P$_i^n$ in a coding block B$^n$.

Next, the process carried out by the intra prediction unit 4 will be explained in detail. FIG. 7 is an explanatory drawing showing an example of the intra prediction parameters (intra prediction modes) which can be selected for each partition $P_i^n$ in the coding block $B^n$. In the example shown in FIG. 7, intra prediction modes and prediction direction vectors represented by each of the intra prediction modes are shown, and it is designed that a relative angle between prediction direction vectors becomes small with increase in the number of selectable intra prediction modes.

The intra prediction part 4 carries out an intra prediction process on the partition $P_i^n$ on the basis of the intra prediction parameter for the partition $P_i^n$ and a selection parameter for a filter which the intra prediction part uses for the generation of an intra prediction image $P_i^n$. Hereafter, an intra process of generating an intra prediction signal of the luminance signal on the basis of the intra prediction parameter (intra prediction mode) for the luminance signal of the partition $P_i^n$ will be explained.

Figure 8:
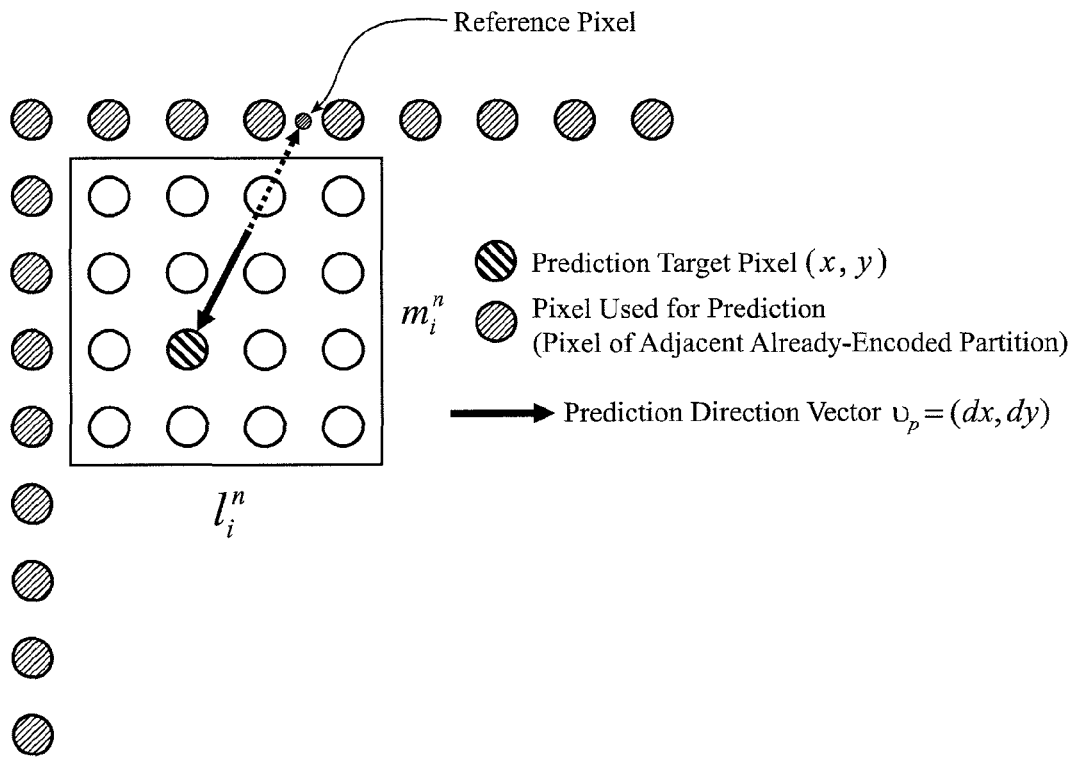
FIG. 8 is an explanatory drawing showing an example of pixels which are used when generating a predicted value of each pixel in a partition P$_i^n$ in the case of $l_i^n = m_i^n = 4$.

Hereafter, the partition $P_i^n$ is assumed to have a size of $l_i^n \times m_i^n$ pixels. FIG. 8 is an explanatory drawing showing an example of pixels which are used when generating a predicted value of each pixel in the partition $P_i^n$ in the case of $l_i^n = m_i^n = 4$. Although the $(2 \times l_i^n + 1)$ pixels in the already-encoded upper partition which is adjacent to the partition and the $(2 \times m_i^n)$ pixels in the already-encoded left partition which is adjacent to the partition $P_i^n$ are defined as the pixels used for prediction in the example of FIG. 8, a larger or smaller number of pixels than the pixels shown in FIG. 8 can be used for prediction. Further, although one row or column of pixels adjacent to the partition are used for prediction in the example shown in FIG. 8, two or more rows or columns of pixels adjacent to the partition can be alternatively used for prediction.

When the index value indicating the intra prediction mode for the partition $P_i^n$ is 2 (average prediction), the intra prediction part generates an intermediate prediction image by using the average of the adjacent pixels in the upper partition and the adjacent pixels in the left partition as each of the predicted values of all the pixels in the partition $P_i^n$. When the index value indicating the intra prediction mode is other than 2 (average prediction), the intra prediction part generates the predicted value of each pixel in the partition $P_i^n$ on the basis of a prediction direction vector $v_p = (dx, dy)$ shown by the index value. In this case, the relative coordinate of the pixel (the pixel at the upper left corner of the partition is defined as the point of origin) for which the predicted value is to be generated (target pixel for prediction) in the partition $P_i^n$ is expressed as (x, y). Each reference pixel which is used for prediction is located at a point of intersection of A shown below and an adjacent pixel.

$$A = \begin{pmatrix} x \\ y \end{pmatrix} + k v_p$$

Where k is a negative scalar value.

When a reference pixel is located at an integer pixel position, the integer pixel is defined as the predicted value of the target pixel for prediction. In contrast, when a reference pixel is not located at an integer pixel position, an interpolation pixel which is generated from an integer pixel adjacent to the reference pixel is defined as the predicted value of the target pixel for prediction. In the example shown in FIG. 8, because a reference pixel is not located at an integer pixel position, the predicted value is interpolated from the values of two pixels adjacent to the reference pixel. However, the interpolation of the predicted value is not limited to the one from the values of two adjacent pixels, and an interpolation pixel can be generated from two or more adjacent pixels and the value of this interpolation pixel can be defined as the predicted value.

The intra prediction part then carries out a filtering process, which will be mentioned below, on the intermediate prediction image which consists of the predicted values in the partition $P_i^n$ generated according to the above-mentioned procedure to acquire a final intra prediction image $P_i^n$, and outputs the intra prediction image $P_i^n$ to the subtracting part 6 and the adding part 9. The intra prediction part also outputs the intra prediction parameter used for the generation of the intra prediction image $P_i^n$ to the variable length encoding part 13 in order to multiplex them into a bitstream. Hereafter, the filtering process will be explained concretely.

The intra prediction part selects a filter to be used from one or more filters which are prepared in advance by using a method which will be mentioned below, and carries out a filtering process on each pixel of the intermediate prediction image according to the following equation (1).

$$\hat{s}(p_0) = a_0 s(p_0) + a_1 s(p_1) + \ldots + a_{N-1} s(p_{N-1}) + a_N \quad (1)$$

Figure 9:
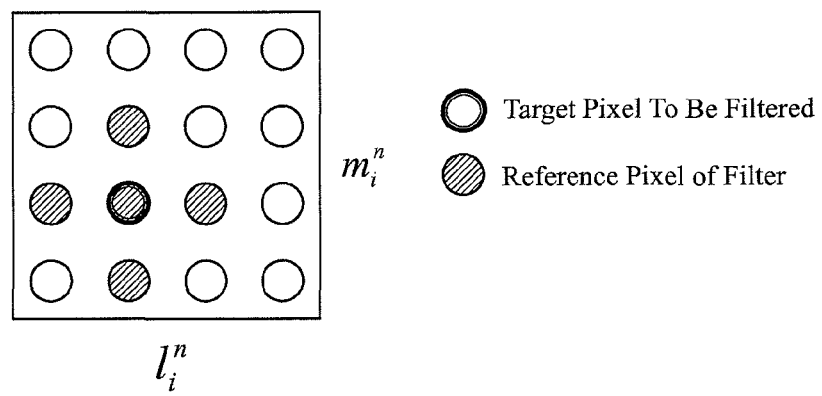
FIG. 9 is an explanatory drawing showing an example of the arrangement of reference pixels in the case of N=5.
Figure 10:
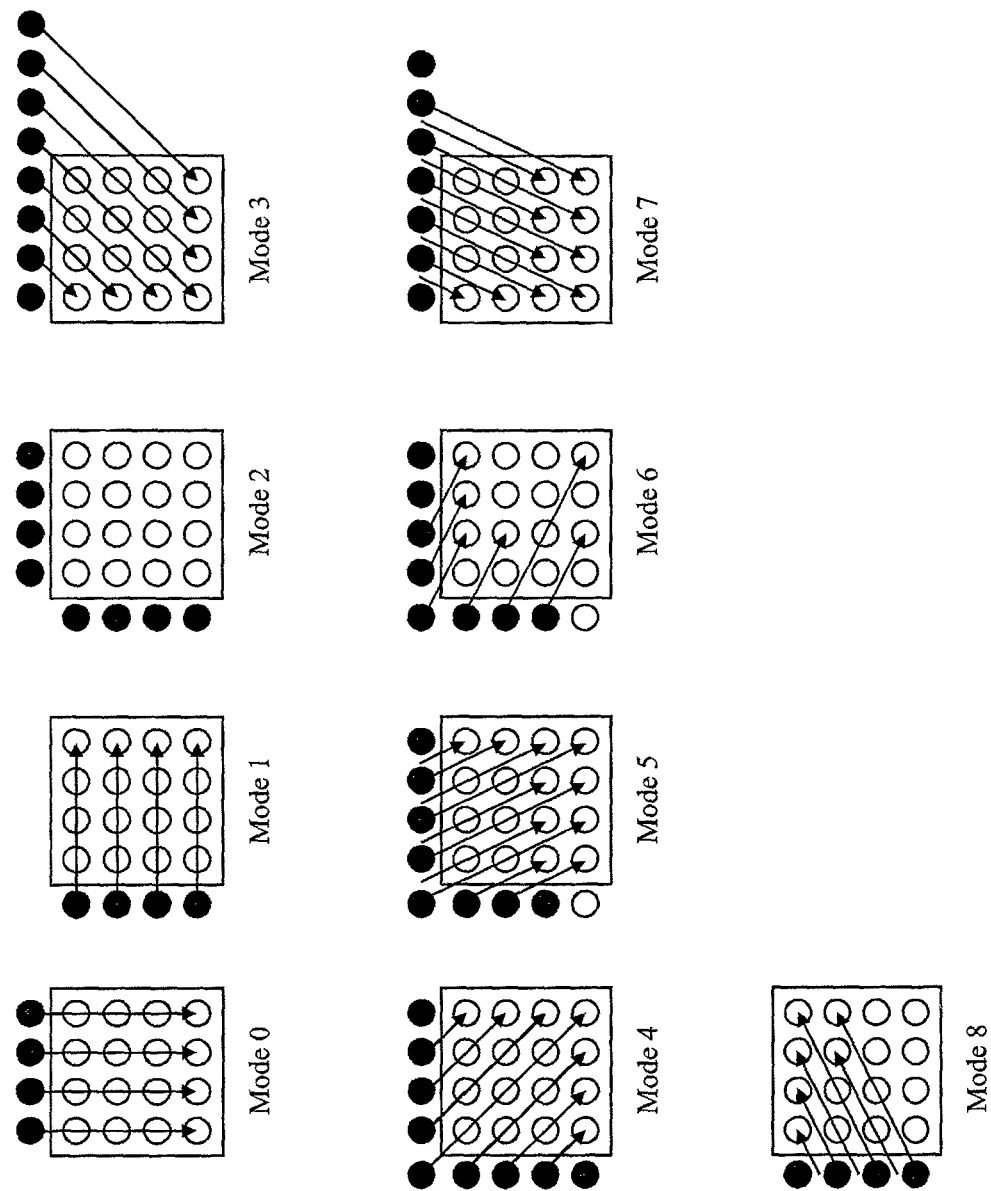
FIG. 10 is an explanatory drawing showing intra prediction modes described in nonpatent reference 1 in the case of a 4×4 pixel block size for luminance.

In the equation (1), an (n=0, 1, ..., N) is filter coefficients which consist of coefficients ($a_0$, $a_1$, ..., $a_{N-1}$) associated with the reference pixels, and an offset coefficient $a_N$. $p_n$ (n=0, 1, ..., N-1) shows the reference pixels of the filter including the target pixel $p_0$ to be filtered. N is an arbitrary number of reference pixels. $s(p_n)$ shows the luminance value of each reference pixel, and s hat ($p_0$) shows the luminance value of the target pixel $p_0$ to be filtered on which the filtering process has been carried out. The filter coefficients can be formed so as not to include the offset coefficient $a_N$. Further, the luminance value of each pixel of the intermediate prediction image can be defined as the luminance value $s(p_n)$ of each reference pixel located in the partition $P_i^n$. As an alternative, the filtered luminance value can be defined as the luminance value $s(p_n)$ only at the position of each pixel on which the filtering process has been carried out. An encoded luminance value (luminance value to be decoded) is set as the luminance value $s(p_n)$ of each reference pixel located outside the partition $P_i^n$ when the pixel is in an already-encoded region, while a signal value to be used in place of the luminance value $s(p_n)$ is selected from the luminance value $s(p_n)$ of each reference pixel located in the partition P, which is defined in the above-mentioned way, and the encoded luminance value in the already-encoded area according to a predetermined procedure (for example, the signal value of a pixel at the nearest position is selected from among those of pixels which are candidates) when the pixel is in a yet-to-be-encoded region. FIG. 9 is an explanatory drawing showing an example of the arrangement of the reference pixels in the case of N=5.

When carrying out the above-mentioned filtering process, a nonlinear edge or the like occurs in the inputted image more easily and hence a displacement from the prediction direction of the intermediate prediction image occurs more easily with increase in the size ($l_i^n \times m_i^n$) of the partition $P_i^n$. Therefore, it is preferable to smooth the intermediate prediction image. In addition, the larger quantized value a prediction error has, the larger quantization distortion occurs in the decoded image and hence the lower degree of prediction accuracy the intermediate prediction image generated from already-encoded pixels which are adjacent to the partition $P_i^n$ has. Therefore, it is preferable to prepare a smoothed prediction image which roughly expresses the partition $P_i^n$. Further, even a pixel in the same partition $P_i^n$ has a displacement, such as an edge, occurring between the intermediate prediction image and the inputted image more easily with distance from the already-encoded pixels adjacent to the partition $P_i^n$ which are used for the generation of the intermediate prediction image. Therefore, it is preferable to smooth the prediction image to suppress the rapid increase in the prediction error which is caused when a displacement occurs.

Further, the intra prediction at the time of generating the intermediate prediction image is configured in such a way as to use either of the two following different methods: an average prediction method of making all the predicted values in a prediction block be equal to one another, and a prediction method using the prediction direction vector $v_p$. In addition, also in the case of the prediction using the prediction direction vector $v_p$, a pixel not located at an integer pixel position is generated through interpolation on both a pixel for which the value of a reference pixel at an integer pixel position is set as its predicted value just as it is, and at least two reference pixels, the location in the prediction block of a pixel having the value of the generated pixel as its predicted value differs according to the direction of the prediction direction vector $v_p$. Therefore, because the prediction image has a property different according to the intra prediction mode, and the optimal filtering process also changes according to the intra prediction mode, it is preferable to also change the intensity of the filter, the number of reference pixels to be referred to by the filter, the arrangement of the reference pixels, etc. according to the index value showing the intra prediction mode.

Therefore, the filter selecting process is configured in such a way as to select a filter in consideration of the four following parameters (1) to (4).
(1) The size of the partition $P_i^n$ ($l_i^n \times m_i^n$)
(2) The quantization parameter included in the prediction error encoding parameters
(3) The distance between the group of already-encoded pixels ("pixels which are used for prediction" shown in FIG. 8) which are used at the time of generating the intermediate prediction image, and the target pixel to be filtered
(4) The index value indicating the intra prediction mode at the time of generating the intermediate prediction image.

Figure 11:
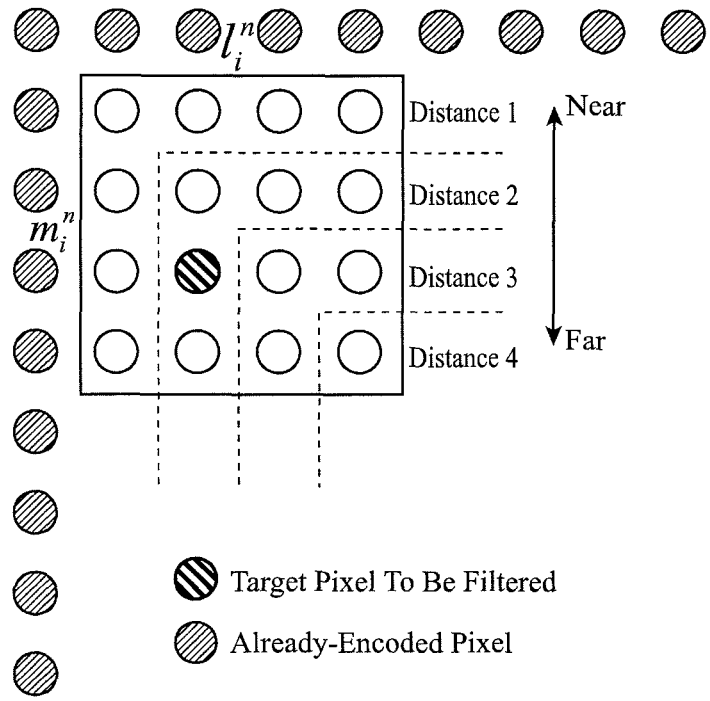
FIG. 11 is an explanatory drawing showing an example of the distances between already-encoded pixels in a frame which are used when generating a prediction image, and each target pixel to be filtered.

More specifically, the filter selecting process is configured in such a way as to use a filter having a higher degree of smoothing intensity or a filter having a larger number of reference pixels with increase in the size ($l_i^n \times m_i^n$) of the partition $P_i^n$, with increase in the quantized value determined by the quantization parameter, and with distance between the target pixel to be filtered and the group of already-encoded pixels which are located on the left side and on the upper side of the partition $P_i^n$. An example of the distance between the target pixel to be filtered and the group of already-encoded pixels which are located on the left side and on the upper side of the partition $P_i^n$ is listed in FIG. 11. Further, the filter selecting process is configured in such a way as to also change the intensity of the filter, the number of reference pixels to be referred to by the filter, the arrangement of the reference pixels, etc. according to the index value showing the intra prediction mode. More specifically, an adaptive selection of a filter according to the above-mentioned parameters is implemented by bringing an appropriate filter selected from among the group of filters which are prepared in advance into correspondence with each of combinations of the above-mentioned parameters. Further, for example, when combining the parameters (3) and (4), the definition of the "distance between the target pixel to be filtered and the group of already-encoded pixels" of the parameter (3) can be changed adaptively according to the "intra prediction mode" of the parameter (4). More specifically, the definition of the distance between the target pixel to be filtered and the group of already-encoded pixels is not limited to the one fixed as shown in FIG. 11, and can be a distance depending upon the prediction direction, such as the distance from a "reference pixel" shown in FIG. 8. By doing in this way, the intra prediction part can implement an adaptive filtering process which also takes into consideration a relationship between the plurality of parameters such as the parameters (3) and (4). Further, a combination for not carrying out any filtering process can be prepared as one of combinations of these parameters while being brought into correspondence with "no filtering process." In addition, as a definition of the intensity of the filter, the weakest filter can be defined as "no filtering process." Further, because the four parameters (1) to (4) are known in the moving image decoding device, no additional information to be encoded required to carry out the above-mentioned filtering process is generated. As previously explained, by preparing a necessary number of filters in advance and adaptively selecting one of them, the intra prediction part switches among the filters. As an alternative, by defining a function of the above-mentioned filter selection parameters as each filter in such a way that a filter is computed according to the values of the above-mentioned filter selection parameters, the intra prediction part can implement switching among the filters.

Although the example of selecting a filter in consideration of the four parameters (1) to (4) is shown in the above explanation, a filter can be alternatively selected in consideration of at least one of the four parameters (1) to (4). Hereafter, an example of the configuration of the filtering process of adaptively selecting a filter by bringing an appropriate filter included in a filter group prepared in advance into correspondence with each of combinations of the parameters will be shown by taking a case of using the parameters (1) and (4) as an example.

Figure 12:
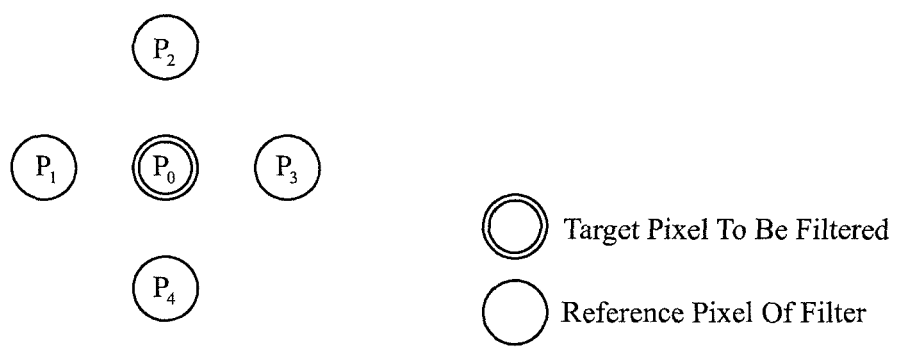
FIG. 12 is an explanatory drawing showing a concrete arrangement of reference pixels to be referred to by a filter.

Filters which are used in the above-mentioned example of the filtering process are defined as follows:
Filter of filter index of 1 (the number of reference pixels N=3):
$a_0 = 3/4$, $a_1 = 1/8$, $a_2 = 1/8$
Filter of filter index of 2 (the number of reference pixels N=3):
$a_0 = 1/2$, $a_1 = 1/4$, $a_2 = 1/4$
Filter of filter index of 3 (the number of reference pixels N=3):
$a_0 = 1/4$, $a_1 = 3/8$, $a_2 = 3/8$
Filter of filter index of 4 (the number of reference pixels N=5):
$a_0 = 1/4$, $a_1 = 3/16$, $a_2 = 3/16$, $a_3 = 3/16$, $a_4 = 3/16$
In this case, it is assumed that the filtering process is based on the equation (1) from which the offset coefficient $a_N$ is eliminated ($a_N = 0$), three types of filters are used, and each of these filters has such an arrangement of reference pixels to be referred to thereby as shown in FIG. 12.

FIG. 13 is an explanatory drawing showing an example of a table showing filters which are used in each intra prediction mode for each size of the partition $P_i^n$. In this example, it is assumed that the partition $P_i^n$ has one of possible sizes of 4×4 pixels, 8×8 pixels, 16×16 pixels, 32×32 pixels, and 64×64 pixels, and there is a correspondence, as shown in FIG. 7, between index values each showing an intra prediction mode and intra prediction directions. Further, the filter index of 0 shows that no filtering process is carried out. In general, because there are tendencies as will be shown below when using a directional prediction or an average prediction, by bringing which filter is to be used into correspondence with each combination of the parameters (1) and (4) in the table in consideration of the characteristics of the image in intra predictions, as shown in the table shown in FIG. 13, the intra prediction part can implement the selection of an appropriate filter by referring to the table.

Because a horizontal or vertical edge existing in an artifact, such as a building, is generally linear shaped and clear in many cases, a high-accurate prediction can be carried out by using a horizontal or vertical prediction in many cases. Therefore, it is preferable not to carry out any smoothing process when carrying out a horizontal or vertical prediction.

Because an image signal generally has high spatial continuity, it is preferable to carry out a smoothing process on pixels located in the vicinity of the block boundaries on the left and upper sides of the partition $P_i^n$, thereby improving the continuity, when using an average prediction which impairs the continuity between the partition $P_i^n$ and already-encoded pixels adjacent to the partition $P_i^n$.

Because in a region having diagonal directivity, an edge or the like is distorted and has a nonlinear shape in many cases with increase in the area of the region, it is preferable to, when using a diagonal prediction, apply a filter having a higher degree of smoothing intensity and a larger number of reference pixels with increase in the partition size.

In general, when the partition size becomes too large, a spatial change of the signal value in the partition becomes diversified, so that the use of a directional prediction or an average prediction results in a very rough prediction, and hence a region where it is difficult to carry out a high-accurate prediction increases. Because no improvement in the prediction efficiency can be expected by simply carrying out a smoothing process to make the image become blurred in such a region, it is preferable not to carry out any filtering process in the case of such a large partition size because it is not necessary to increase the computational complexity unnecessarily (for example, in the table shown in FIG. 13, there is a setting not to carry out any filtering process in the case of a partition size of 32×32 pixels or more).

Figure 14:
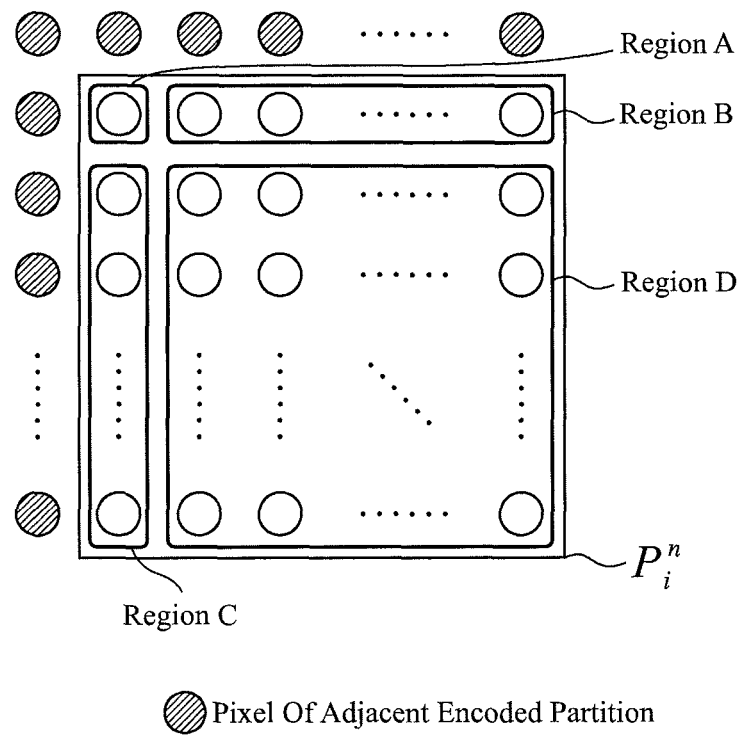
FIG. 14 is an explanatory drawing showing an example of simplification of a filtering process when an average prediction is carried out.

In addition, in a case in which the luminance value of the intermediate prediction image is used as the luminance value of each reference pixel when each reference pixel at the time that a filtering process is carried out is a pixel in the partition $P_i^n$, there is a case in which the filtering process can be simplified. For example, when the intra prediction mode is an average prediction, the filtering process on the partition $P_i^n$ can be simplified to the following filtering process for each region shown in FIG. 14.

Region A (Pixel at the Upper Left Corner of the Partition $P_i^n$)
  Filter of filter index of 1 (no change):
    $a_0=3/4$, $a_1=1/8$, $a_2=1/8$ (the number of reference pixels N=3)
  Filter of filter index of 2 (no change):
    $a_0=1/2$, $a_1=1/4$, $a_2=1/4$ (the number of reference pixels N=3)
  Filter of filter index of 3 (no change):
    $a_0=1/4$, $a_1=3/8$, $a_2=3/8$ (the number of reference pixels N=3)
  Filter of filter index of 4:
    $a_0=5/8$, $a_1=3/16$, $a_2=3/16$ ((the number of reference pixels N=3)
Region B (Pixels at the Upper End of the Partition $P_i^n$ Other than the Region A)
  Filter of filter index of 1:
    $a_0=7/8$, $a_2=1/8$ (the number of reference pixels N=2)
  Filter of filter index of 2:
    $a_0=3/4$, $a_2=1/4$ (the number of reference pixels N=2)
  Filter of filter index of 3:
    $a_0=5/8$, $a_2=3/8$ (the number of reference pixels N=2)
  Filter of filter index of 4:
    $a_0=13/16$, $a_2=3/16$ (the number of reference pixels N=2)

Region C (Pixels at the Left End of the Partition $P_i^n$ Other than the Region A)
  Filter of filter index of 1:
    $a_0=7/8$, $a_1=1/8$ (the number of reference pixels N=2)
  Filter of filter index of 2:
    $a_0=3/4$, $a_1=1/4$ (the number of reference pixels N=2)
  Filter of filter index of 3:
    $a_0=5/8$, $a_1=3/8$ (the number of reference pixels N=2)
  Filter of filter index of 4:
    $a_0=13/16$, $a_1=3/16$ (the number of reference pixels N=2)
Region D (Pixels in the Partition $P_i^n$ Other than the Regions A, B, and C)
  Filters of all filter indexes: no filtering process Even if the filtering process is simplified in the above-mentioned way, the results of the filtering process are the same as those of the filtering process yet to be simplified. By removing the redundant parts of the actual process in this way, the filtering process can be speeded up.

Although the table shown in FIG. 13 is used in the above-mentioned example, another table can be alternatively used. For example, when greater importance is placed on a reduction in the computational complexity caused by the filtering process than on the degree of improvement in the encoding performance, a table shown in FIG. 19 can be used instead of the table shown in FIG. 13. Because the intra prediction unit carries out the filtering process only on the average prediction of the partition $P_i^n$ whose size is 4×4 pixels, 8×8 pixels, or 16×16 pixels in the case of using this table, the number of prediction modes in each of which the filtering process is carried out is less than that in the case of using the table shown in FIG. 13, and therefore the increase in the computational complexity caused by the filtering process can be reduced. At this time, by using a simplification of the filtering process in the case in which the above-mentioned intra prediction mode is an average prediction, the filtering process can be implemented with very low computational complexity. In addition, when importance is placed on the ease of implementation, the intra prediction unit can carry out the filtering process only on the average prediction, like in the case of carrying out the above-mentioned filtering process, and can use the same filter (e.g., the filter of filter index of 2) at all times without not having to change the filter to be used according to the size of the partition $P_i^n$. In that case, while the degree of improvement in the encoding performance using the filter is reduced by a degree corresponding to the elimination of the process according to the size of the partition $P_i^n$, the circuit scale of the intra prediction unit installed in the device (the number of lines in the code in the case of implementing the intra prediction unit via software) can be reduced. This filtering process is simplified to a filter which takes into consideration only the parameter (4) among the four parameters (1) to (4).

The filtering process does not have to be implemented in a form in which a filter having a corresponding filter index is selected through reference to the table, and can be alternatively implemented in a form in which the filter is installed directly in the intra prediction part. For example, the filtering process is implemented in a form in which a filtering process to be carried out for each of the possible sizes of the partition $P_i^n$ is incorporated directly into the intra prediction part, or a filtering process to be carried out for each pixel position in each of the possible sizes of the partition $P_i^n$ is incorporated directly into the intra prediction part. As long as the prediction image which is acquired as the result of carrying out the filtering process without referring to the table in this way is equivalent to that acquired as the result of carrying out the filtering process by referring to the table, the form of the implementation is not an issue.

Figure 15:
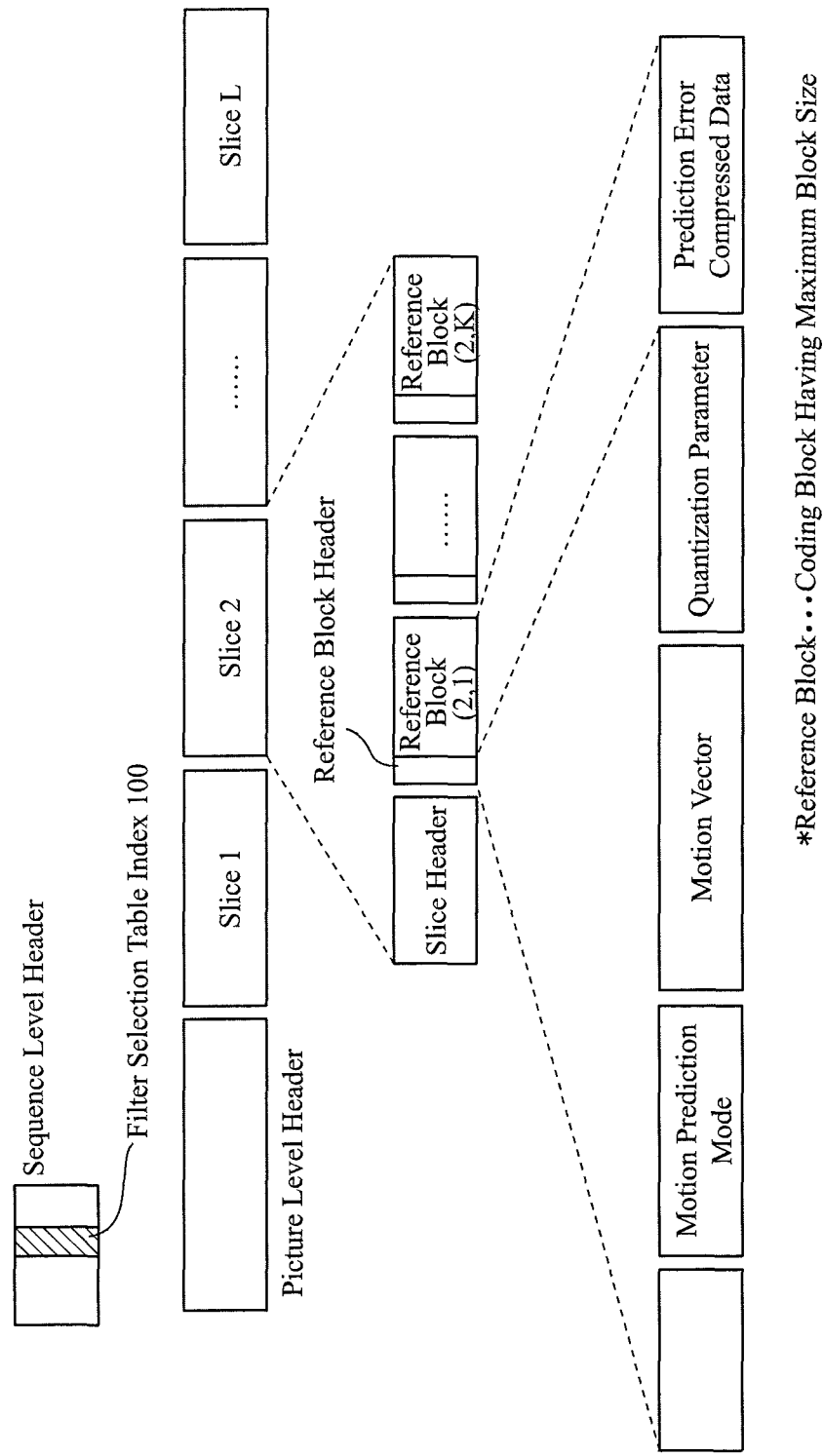
FIG. 15 is an explanatory drawing showing an example of a bitstream in which a filter selection table index is added to a sequence level header.
Figure 16:
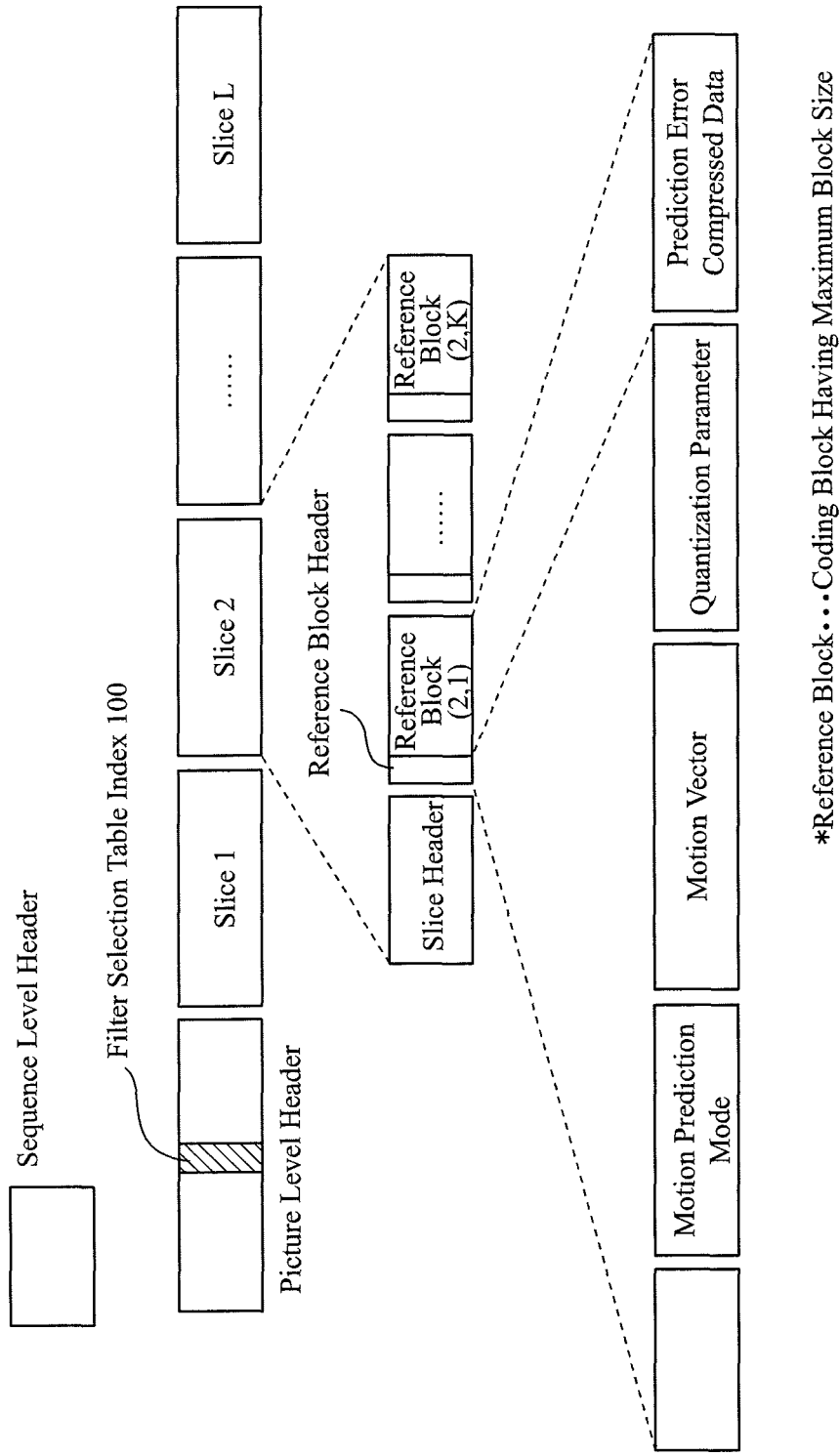
FIG. 16 is an explanatory drawing showing an example of a bitstream in which a filter selection table index is added to a picture level header.
Figure 17:
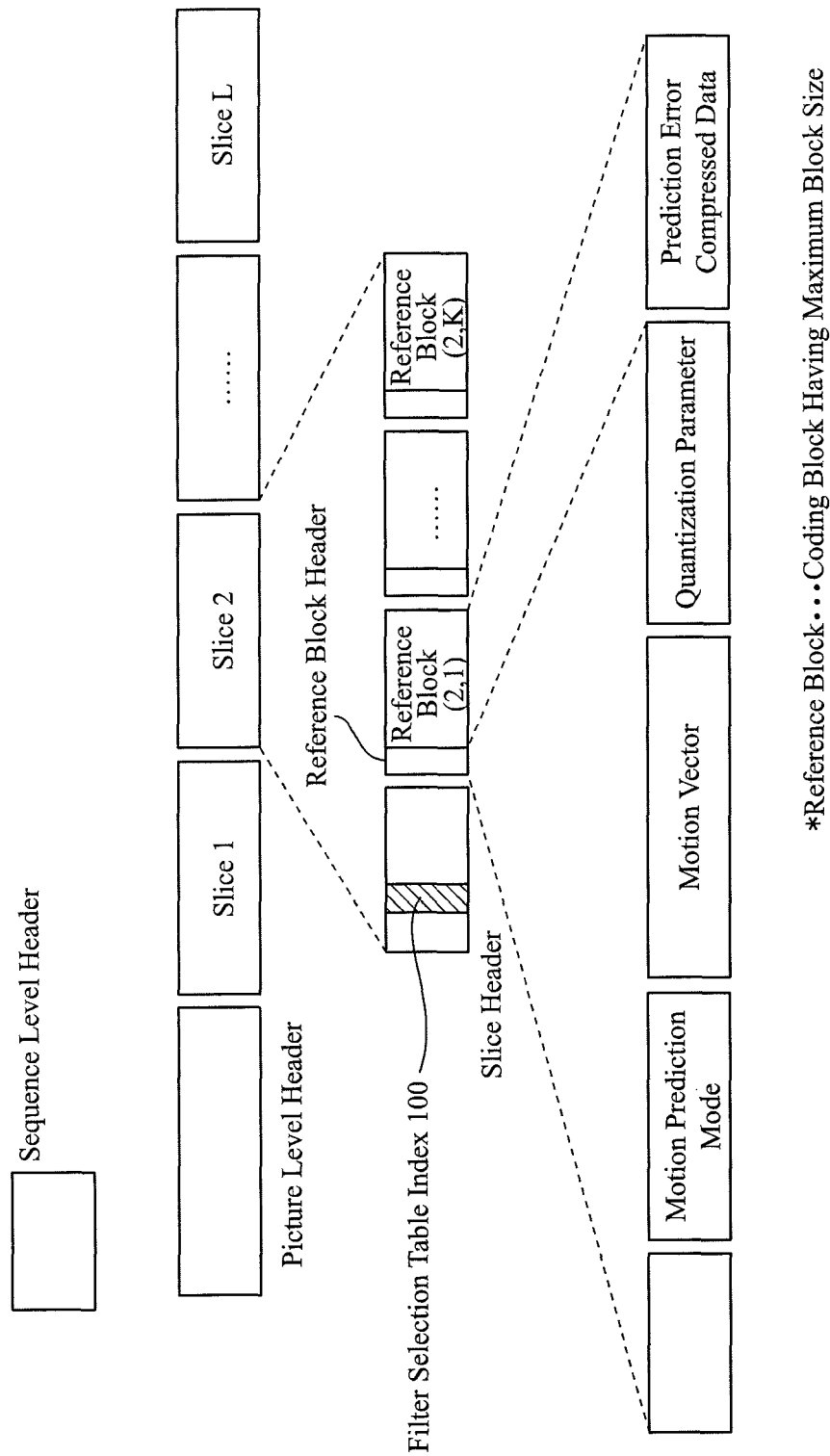
FIG. 17 is an explanatory drawing showing an example of a bitstream in which a filter selection table index is added to a slice header.
Figure 18:
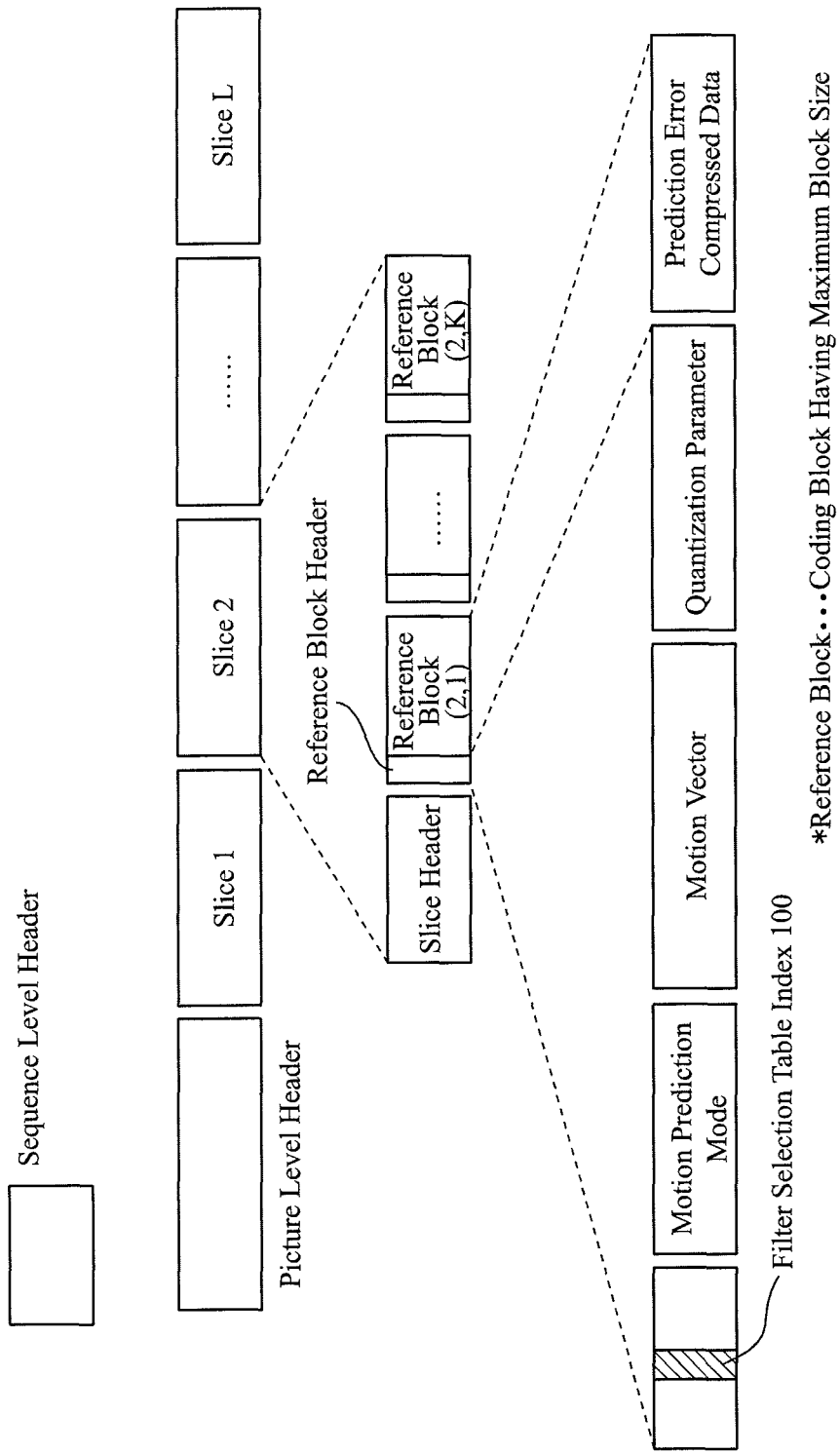
FIG. 18 is an explanatory drawing showing an example of a bitstream in which a filter selection table index is added to a reference block header.

Further, although the method of using only one table for switching among the filters is explained in the example mentioned above, two or more tables as mentioned above can be prepared, and the moving image encoding device can be constructed in such a way as to encode a filter selection table index 100 as header information in such a form as shown in either of FIGS. 15 to 18, and switch among the filter selection tables for each predetermined unit. For example, by adding the filter selection table index 100 to a sequence level header, as shown in FIG. 15, the moving image encoding device can carry out a filtering process more suitable for the characteristics of the sequence as compared with the case of using only a single table.

Even in a case in which the intra prediction part 4 is constructed in such a way as to set already-encoded pixels adjacent to the partition $P_i^n$ on which the intra prediction part has carried out the smoothing process as the reference pixels at the time of generating an intermediate prediction image of the partition $P_i^n$, like in a case in which a smoothing process is carried out on a reference image at the time of an intra prediction on an 8×8-pixel block in MPEG-4 AVC/H.264 explained previously, the intra prediction part 4 can carry out the filtering process on an intermediate prediction image similar to that shown in the above-mentioned example. On the other hand, because there is an overlap between the effect of the smoothing process on the reference pixels at the time of generating an intermediate prediction image and that of the filtering process on the intermediate prediction image, there is a case in which even if both the processes are used simultaneously, only a very small performance improvement is produced as compared with a case in which one of the processes is carried out. Therefore, in a case in which importance is placed on reduction in the computational complexity, the intra prediction part can be constructed in such a way as not to carry out the filtering process on the intermediate prediction image of the partition $P_i^n$ for which the intra prediction part has carried out the smoothing process on the reference pixels at the time of generating the intermediate prediction image. For example, there can be a case in which when carrying out the filtering process on the intermediate prediction image, the intra prediction part carries out the filtering process only on an average prediction, as shown in the table of FIG. 19, while when carrying out the smoothing process on the reference pixels at the time of generating the intermediate prediction image, the intra prediction part carries out the smoothing process by referring to the table, as shown in FIG. 20, showing that only specific directional predictions are subjected to the smoothing process. In FIG. 20, '1' shows that the smoothing process is carried out and '0' shows that the smoothing process is not carried out.

The intra prediction part outputs the intra prediction parameter used for the generation of the intra prediction image Pi to the variable length encoding part 13 in order to multiplex them into a bitstream. The intra prediction part also carries out an intra prediction process based on the intra prediction parameter (intra prediction mode) on each of the color difference signals of the partition $P_i^n$ according to the same procedure as that according to which the intra prediction part carries out the intra prediction process on the luminance signal, and outputs the intra prediction parameters used for the generation of the intra prediction image to the variable length encoding part 13. The intra prediction part can be constructed in such a way as to carry out the above-explained filtering process for the intra prediction of each of the color difference signals in the same way that the intra prediction part does for the luminance signal, or not to carry out the above-explained filtering process for the intra prediction of each of the color difference signals.

Next, the processing carried out by the moving image decoding device shown in FIG. 2 will be explained. When receiving the bitstream outputted thereto from the image encoding device of FIG. 1, the variable length decoding part 51 carries out a variable length decoding process on the bitstream to decode information having a frame size in units of a sequence which consists of one or more frames of pictures or in units of a picture (step ST21 of FIG. 4). The variable length decoding part 51 determines a maximum size of each of coding blocks which is a unit to be processed at a time when an intra prediction process (intra-frame prediction process) or a motion-compensated prediction process (inter-frame prediction process) is carried out according to the same procedure as that which the encoding controlling part 1 shown in FIG. 1 uses, and also determines an upper limit on the number of hierarchical layers in a hierarchy in which each of the coding blocks having the maximum size is hierarchically divided into blocks (step ST22). For example, when the maximum size of each of coding blocks is determined according to the resolution of the inputted image in the image encoding device, the variable length decoding part determines the maximum size of each of the coding blocks on the basis of the frame size information which the variable length decoding part has decoded previously. When information showing both the maximum size of each of the coding blocks and the upper limit on the number of hierarchical layers is multiplexed into the bitstream, the variable length decoding part refers to the information which is acquired by decoding the bitstream.

Because the information showing the state of the division of each of the coding blocks $B^0$ having the maximum size is included in the coding mode $m(B^0)$ of the coding block $B^0$ having the maximum size which is multiplexed into the bitstream, the variable length decoding part 51 specifies each of the coding blocks $B^n$ into which the image is divided hierarchically by decoding the bitstream to acquire the coding mode $m(B^0)$ of the coding block $B^0$ having the maximum size which is multiplexed into the bitstream (step ST23). After specifying each of the coding blocks $B^n$, the variable length decoding part 51 decodes the bitstream to acquire the coding mode $m(B^n)$ of the coding block $B^n$ to specify each partition $P_i^n$ belonging to the coding block $B^n$ on the basis of the information about the partition $P_i^n$ belonging to the coding mode $m(B^n)$. After specifying each partition $P_i^n$ belonging to the coding block $B^n$, the variable length decoding part 51 decodes the encoded data to acquire the compressed data, the coding mode, the prediction error encoding parameters, and the intra prediction parameter/inter prediction parameter for each partition $P_i^n$ (step ST24).

More specifically, when the coding mode $m(B^n)$ assigned to the coding block $B^n$ is an intra coding mode, the variable length decoding part decodes the encoded data to acquire the intra prediction parameter for each partition $P_i^n$ belonging to the coding block. In contrast, when the coding mode $m(B^n)$ assigned to the coding block $B^n$ is an inter coding mode, the variable length decoding part decodes the encoded data to acquire the inter prediction parameters for each partition $P_i^n$ belonging to the coding block. The variable length decoding part further divides each partition which is a prediction unit into one or more partitions which is a transformation process unit on the basis of the transform block size information included in the prediction error encoding parameters, and decodes the encoded data of each of the one or more partitions which is a transformation process unit to acquire the compressed data (transform coefficients on which transformation and quantization are carried out) of the partition.

When the coding mode m(B″) of the partition $P_i''$ belonging to the coding block B″, which is specified by the variable length decoding part 51, is an intra coding mode (step ST25), the selection switch 52 outputs the intra prediction parameters outputted thereto from the variable length decoding part 51 to the intra prediction part 53. In contrast, when the coding mode m(B″) of the partition $P_i''$ is an inter coding mode (step ST25), the selection switch outputs the inter prediction parameters outputted thereto from the variable length decoding part 51 to the motion-compensated prediction part 54.

When receiving the intra prediction parameter from the selection switch 52, the intra prediction part 53 carries out an intra-frame prediction process on the partition $P_i''$ of the coding block B″ to generate an intra prediction image $P_i''$ by using an already-decoded image signal in the frame on the basis of the intra prediction parameter (step ST26), like the intra prediction part 4 shown in FIG. 1. After generating the above-mentioned intra prediction image $P_i''$, the intra prediction part 53 selects a filter from one or more filters, which are prepared in advance, according to the states of the various parameters which are known at the time of generating the above-mentioned intra prediction image $P_i''$ by using the same method as that which the intra prediction part 4 shown in FIG. 1 uses, and carries out a filtering process on the intra prediction image $P_i''$ by using the filter and sets the intra prediction image $P_i''$ on which the intra prediction part has carried out the filtering process as a final intra prediction image. More specifically, the intra prediction part selects a filter by using the same parameters as those which the intra prediction part 4 uses for the filter selection and by using the same method as the filter selection method which the intra prediction part 4 uses, and carries out the filtering process on the intra prediction image. For example, in a case in which the intra prediction part 4 brings the case of not carrying out the filtering process into correspondence with the filter index of 0, and further brings four filters which are prepared in advance into correspondence with filter indexes of 1 to 4 respectively, and carries out the filtering process by referring to the table shown in FIG. 13, the intra prediction part 53 is constructed in such a way as to also define the same filters and filter indexes as those for use in the intra prediction part 4, and carry out a filter selection according to the size of the partition $P_i''$ and the index showing an intra prediction mode which is an intra prediction parameter by referring to the table shown in FIG. 13 and carry out the filtering process.

Further, in a case in which a table for defining a filter which is used for each combination of parameters is prepared, and the intra prediction part implements switching among filters by referring to the table, as shown in the above-mentioned example, the intra prediction part is constructed in such a way as to decode the filter selection table index 100 as header information in a form as shown in either of FIGS. 15 to 18, select the table shown by the decoded filter selection table index 100 from the same table group as that which the moving image encoding device uses, the table group being prepared in advance, and select a filter by referring to the table.

When receiving the inter prediction parameters from the selection switch 52, the motion-compensated prediction part 54 carries out an motion-compensated prediction process on the partition $P_i''$ of the coding block B″ to generate an inter prediction image $P_i''$ by using one or more frames of reference images stored in the motion-compensated prediction frame memory 59 on the basis of the inter prediction parameters (step ST27).

The inverse quantization/inverse transformation part 55 inverse-quantizes the compressed data associated with the coding block, which are outputted thereto from the variable length decoding part 51, by using the quantization parameter included in the prediction error encoding parameters outputted thereto from the variable length decoding part 51, and carries out an inverse transformation process (e.g., an inverse DCT (inverse discrete cosine transform) or an inverse transformation process such as an inverse KL transform) on the compressed data inverse-quantized thereby in units of a block having the transform block size included in the prediction error encoding parameters, and outputs the compressed data on which the inverse quantization/inverse transformation part has carried out the inverse transformation process to the adding part 56 as a decoded prediction error signal (signal showing a pre-compressed difference image) (step ST28).

When receiving the decoded prediction error signal from the inverse quantization/inverse transformation part 55, the adding part 56 generates a decoded image by adding the decoded prediction error signal and the prediction signal showing the prediction image generated by the intra prediction part 53 or the motion-compensated prediction part 54 and stores a decoded image signal showing the decoded image in the memory 57 for intra prediction, and also outputs the decoded image signal to the loop filter part 58 (step ST29).

The moving image decoding device repeatedly carries out the processes of steps ST23 to ST29 until the moving image decoding device completes the processing on all the coding blocks B″ into which the image is divided hierarchically (step ST30). When receiving the decoded image signal from the adding part 56, the loop filter part 58 compensates for an encoding distortion included in the decoded image signal, and stores the decoded image shown by the decoded image signal on which the loop filter part performs the encoding distortion compensation in the motion-compensated prediction frame memory 59 as a reference image (step ST31). The loop filter part 58 can carry out the filtering process for each coding block having the maximum size of the local decoded image signal outputted thereto from the adding part 56 or each coding block. As an alternative, after the local decoded image signal corresponding to all the macroblocks of one screen is outputted, the loop filter part can carry out the filtering process on all the macroblocks of the one screen at a time.

As can be seen from the above description, because the intra prediction part 4 of the moving image encoding device in accordance with this Embodiment 1 is constructed in such a way as to, when carrying out an intra-frame prediction process to generate an intra prediction image by using an already-encoded image signal in a frame, select a filter from one or more filters which are prepared in advance according to the states of various parameters associated with the encoding of a target block to be filtered, and carry out a filtering process on a prediction image by using the filter, there is provided an advantage of being able to reduce prediction errors which occur locally, thereby being able to improve the image quality.

Further, because the intra prediction part 4 in accordance with this Embodiment 1 is constructed in such a way as to select a filter in consideration of at least one of the following parameters: (1) the size of the partition $P_i''$ ($l_i'' \times m_i''$); (2) the quantization parameter included in the prediction error encoding parameters; (3) the distance between the group of already-encoded pixels which are used at the time of generating the intermediate prediction image, and the target pixel to be filtered; and (4) the index value indicating the intra prediction mode at the time of generating the intermediate prediction image, there is provided an advantage of preventing a local prediction error from occurring when, for example, an edge of the image to be encoded becomes distorted slightly in a nonlinear shape or a slight displacement occurs in the angle of an edge in the image to be encoded when carrying out a directional prediction, and preventing a prediction error from occurring at a boundary between blocks due to a loss of the continuity with the signal of an already-encoded pixel adjacent to the partition when carrying out an average prediction, thereby being able to improve the prediction efficiency.

Because the intra prediction part 53 of the moving image decoding device in accordance with this Embodiment 1 is constructed in such a way as to, when carrying out an intra-frame prediction process to generate an intra prediction image by using an already-decoded image signal in a frame, select a filter from one or more filters which are prepared in advance according to the states of various parameters associated with the decoding of a target block to be filtered, and carry out a filtering process on a prediction image by using the filter, there is provided an advantage of reducing prediction errors which occur locally while making it possible for the moving image decoding device to also generate the same intra prediction image as that generated by the moving image encoding device.

Further, because the intra prediction part 53 in accordance with this Embodiment 1 is constructed in such a way as to select a filter in consideration of at least one of the following parameters: (1) the size of the partition $P_i^n$ ($l_i^n \times m_i^n$); (2) the quantization parameter included in the prediction error encoding parameters; (3) the distance between the group of already-encoded pixels which are used at the time of generating the intermediate prediction image, and the target pixel to be filtered; and (4) the index value indicating the intra prediction mode at the time of generating the intermediate prediction image, there are provided an advantage of preventing a local prediction error from occurring when, for example, an edge of the image to be encoded becomes distorted slightly in a nonlinear shape or a slight displacement occurs in the angle of an edge in the image to be encoded when carrying out a directional prediction, and preventing a prediction error from occurring at a boundary between blocks due to a loss of the continuity with the signal of an already-encoded pixel adjacent to the partition when carrying out an average prediction, and another advantage of making it possible for the moving image decoding device to also generate the same intra prediction image as that generated by the moving image encoding device.

Embodiment 2

Although the example in which the intra prediction part 4 selects a filter according to the states of various parameters associated with the encoding of a target block to be filtered from one or more filters which are prepared in advance, and carries out a filtering process on a prediction image by using the filter when carrying out an intra-frame prediction process to generate an intra prediction image by using an already-encoded image signal in a frame is shown in above-mentioned Embodiment 1, as an alternative, a Wiener filter which minimizes the sum of squared errors between a coding block and a prediction image can be designed, and, when the use of this Wiener filter increases the degree of reduction in prediction errors as compared with the use of the filter which has been selected from the one or more filters which are prepared in advance, the filtering process can be carried out on the prediction image by using the above-mentioned Wiener filter, instead of the filter which has been selected. Hereafter, processes will be explained concretely.

Each of the intra prediction parts 4 and 53 in accordance with above-mentioned Embodiment 1 is constructed in such a way as to select a filter from one or more filters which are prepared in advance according to the states of various parameters associated with the encoding of a target block to be filtered. While each of the intra prediction parts can select an appropriate filter from the one or more selection candidates in consideration of the four parameters (1) to (4), each of the intra prediction parts cannot carry out "optimal filtering" when an optimal filter other than the one or more selection candidates exists. This Embodiment 2 is characterized in that while a moving image encoding device designs an optimal filter on a per picture basis and carries out a filtering process, and also encodes the filter coefficients of the filter, and so on, a moving image decoding device decodes the filter coefficients and so on, and carries out a filtering process by using the filter.

An intra prediction part 4 of the moving image encoding device carries out an intra-frame prediction process on each partition $P_i^n$ of each coding block $B^n$ to generate an intra prediction image $P_i^n$, like that according to above-mentioned Embodiment 1. The intra prediction part 4 also selects a filter from one or more filters which are prepared in advance according to the states of various parameters associated with the encoding of a target block to be filtered by using the same method as that the intra prediction part according to above-mentioned Embodiment 1 uses, and carries out a filtering process on the intra prediction image $P_i^n$ by using this filter. After determining intra prediction parameters for each of all coding blocks $B^n$ in the picture, for each area in which an identical filter is used within the picture (each area having the same filter index), the intra prediction part 4 designs a Wiener filter which minimizes the sum of squared errors between the inputted image in the area and the intra prediction image (mean squared error in the target area).

The filter coefficients w of the Wiener filter can be determined from an autocorrelation matrix $R_{s's'}$ of an intermediate prediction image signal s', and a cross correlation matrix $R_{ss'}$ of the inputted image signal s and the intermediate prediction image signal s' according to the following equation (4). The size of the matrices $R_{s's'}$ and $R_{ss'}$ corresponds to the number of filter taps determined.

$$w = R_{s's'}^{-1} \cdot R_{ss'} \tag{4}$$

After designing the Wiener filter, the intra prediction part 4 expresses the sum of squared errors in the target area for filter design in the case of carrying out a filtering process using the Wiener filter as D1, the code amount at the time of encoding information (e.g., filter coefficients) associated with the Wiener filter as R1, and the sum of squared errors in the target area for filter design in the case of carrying out a filtering process using a filter which is selected by using the same method as that shown in above-mentioned Embodiment 1 as D2, and then checks to see whether or not the following equation (5) is established.

$$D1 + \lambda \cdot R1 < D2 \tag{5}$$

Where $\lambda$ is a constant.

When the equation (5) is established, the intra prediction part 4 carries out a filtering process by using the Wiener filter instead of a filter which is selected by using the same method as that shown in above-mentioned Embodiment 1. In contrast, when the equation (5) is not established, the intra prediction part carries out a filtering process by using a filter which the intra prediction part selects by using the same method as that shown in above-mentioned Embodiment 1. Although the intra prediction part carries out the evaluation by using the sums of squared errors D1 and D2, this embodiment is not limited to this example. The intra prediction part can alternatively carry out the evaluation by using measures showing other prediction distortion values, such as the sums of the absolute values of errors, instead of the sums of squared errors D1 and D2.

When carrying out a filtering process by using the Wiener filter, the intra prediction part 4 requires filter update information showing the filter coefficients of the Wiener filter and indexes each indicating a corresponding filter which is replaced by the Wiener filter. More specifically, when the number of filters selectable in the filtering process using filter selection parameters is expressed as L, and indexes ranging from zero to L−1 are assigned to the filters, respectively, when the designed Wiener filter is used for each index, a value of "1" needs to be encoded for the index as the filter update information, whereas when a prepared filter is used for each index, a value of "0" needs to be encoded for the index as the filter update information. A variable length encoding part 13 variable-length-encodes the filter update information outputted thereto from the intra prediction part 4, and multiplexes encoded data of the filter update information into a bitstream.

Although the example of designing a Wiener filter which minimizes the mean squared error between the inputted image and a prediction image in each area for which an identical filter is used within a picture for the area is shown in this embodiment, a Wiener filter which minimizes the mean squared error between the inputted image and a prediction image in each area for which an identical filter is used can be designed for each of other specific areas each of which is not a picture. For example, the above-mentioned design of a Wiener filter can be carried out only for a certain specific picture or only when a specific condition is satisfied (e.g., only for a picture to which a scene change detection function is added and in which a scene change is detected).

A variable length decoding part 51 of a moving image decoding device variable-length-decodes the encoded data multiplexed into the bitstream to acquire the filter update information. An intra prediction part 53 carries out an intra-frame prediction process on each partition $P_i^n$ of each coding block $B^n$ to generate a intra prediction image $P_i^n$, like that according to above-mentioned Embodiment 1. When receiving the filter update information from the variable length decoding part 51, the intra prediction part 53 refers to the filter update information to check to see whether or not there is an update to the filter indicated by the corresponding index.

When determining from the result of the check that the filter for a certain area is replaced by a Wiener filter, the intra prediction part 53 reads the filter coefficients of the Wiener filter which are included in the filter update information to specify the Wiener filter, and carries out a filtering process on the intra prediction image $P_i^n$ by using the Wiener filter. In contrast, for an area in which no filter is replaced by a Wiener filter, the intra prediction part selects a filter by using the same method as that which the intra prediction part according to above-mentioned Embodiment 1 uses, and carries out a filtering process on the intra prediction image $P_i^n$ by using the filter.

As can be seen from the above description, because the moving image encoding device in accordance with this Embodiment 2 is constructed in such a way as to design a Wiener filter which minimizes the sum of squared errors between a coding block and a prediction image, and, when the use of this Wiener filter increases the degree of reduction in prediction errors as compared with the use of a filter which is selected from one or more filters which are prepared in advance, carry out a filtering process on the prediction image by using the Wiener filter, instead of the selected filter, there is provided an advantage of being able to further reduce prediction errors which occur locally as compared with above-mentioned Embodiment 1.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The present invention is suitable for an image encoding device that needs to encode an image with a high degree of efficiency, and is also suitable for an image decoding device that needs to decode an image encoded with a high degree of efficiency.

EXPLANATIONS OF REFERENCE NUMERALS 1 encoding controlling part (encoding controlling unit), 2 block dividing part (block dividing unit), 3 selection switch (intra prediction unit and motion-compensated prediction unit), 4 intra prediction part (intra prediction unit), 5 motion-compensated prediction part (motion-compensated prediction unit), 6 subtracting part (difference image generating unit), 7 transformation/quantization part (image compression unit), 8 inverse quantization/inverse transformation part, 9 adding part, 10 memory for intra prediction, 11 loop filtering part, 12 motion-compensated prediction frame memory, 13 variable length encoding part (variable length encoding unit), 31 variable length decoding part (variable length decoding unit), 52 selection switch (intra prediction unit and motion-compensated prediction unit), 53 intra prediction part (intra prediction unit), 54 motion-compensated prediction part (motion-compensated prediction unit), 55 inverse quantization/inverse transformation part (difference image generating unit), 56 adding part (decoded image generating unit), 57 memory for intra prediction, 58 loop filtering part, 12 motion-compensated prediction frame memory, 100 filter selection table index.

The invention claimed is:
1. An image encoding device comprising:
an intra predictor for, when a coding mode corresponding to one of coding blocks into which an inputted image is divided is an intra coding mode, carrying out an intra-frame prediction process on each block which is a unit for prediction of the coding block to generate a prediction image; and
an encoder for encoding coding mode information and an intra prediction parameter indicating an average prediction, wherein when the intra predictor carries out the average prediction, the intra predictor carries out a filtering process on target pixels of intra prediction located at an upper end and a left end of the block according to a size of the block, the filtering process using an intermediate prediction value, which is an average value of adjacent pixels of the block, and at least one adjacent pixel of the target pixel, and wherein the intra predictor sets a filter coefficient to ½, associated with the intermediate prediction value for a target pixel at an upper left corner of the block, and sets a filter coefficient to ¼, associated with an adjacent pixel adjacent to an upper side or a left side of the target pixel.

2. An image decoding device comprising:

a decoder for decoding coding mode information and an intra prediction parameter; and an intra predictor for, when the coding mode information associated with a coding block is an intra coding mode, carrying out an intra-frame prediction process on each block which is a unit for prediction of the coding block to generate a prediction image, wherein when the intra prediction parameter indicates an average prediction, the intra predictor carries out a filtering process on target pixels of intra prediction located at an upper end and a left end of the block based on an intermediate prediction value and according to a size of the block, which is an average value of adjacent pixels of the block, and at least one adjacent pixel of the target pixel, and wherein the intra predictor sets a filter coefficient to ½, associated with the intermediate prediction value for a target pixel at an upper left corner of the block, and sets a filter coefficient to ¼, associated with an adjacent pixel adjacent to an upper side or a left side of the target pixel.

3. An image encoding method comprising:

carrying out an intra-frame prediction process on each block which is a unit for prediction of a coding block to generate a prediction image, when a coding mode corresponding to the coding block into which an inputted image is divided is an intra coding mode; and encoding coding mode information and an intra prediction parameter indicating an average prediction, wherein when the average prediction is carried out, a filtering process is carried out on target pixels of intra prediction located at an upper end and a left end of the block which is a unit for prediction of the coding block according to a size of the block, the filtering process using an intermediate prediction value, which is an average value of adjacent pixels of the block, and at least one adjacent pixel of the target pixel, and wherein the filtering process sets a filter coefficient to ½, associated with the intermediate prediction value for a target pixel at an upper left corner of the block, and sets a filter coefficient to ¼, associated with an adjacent pixel adjacent to an upper side or a left side of the target pixel.

4. An image decoding method comprising:

decoding coding mode information and an intra prediction parameter; and carrying out an intra-frame prediction process on each block which is a unit for prediction of a coding block to generate a prediction image, when the coding mode information associated with the coding block is an intra coding mode, wherein when the intra prediction parameter indicates an average prediction, a filtering process is carried out on target pixels of intra prediction located at an upper end and a left end of the block which is a unit for prediction of the coding block, the filtering process using an intermediate prediction value and according to a size of the block, which is an average value of adjacent pixels of the block, and at least one adjacent pixel of the target pixel, and wherein the filtering process sets a filter coefficient to ½, associated with the intermediate prediction value for a target pixel at an upper left corner of the block, and sets a filter coefficient to ¼, associated with an adjacent pixel adjacent to an upper side or a left side of the target pixel.

* * * * *

UNITED STATES PATENT AND TRADEMARK OFFICE
CERTIFICATE OF CORRECTION

PATENT NO. : 9,736,478 B2
APPLICATION NO. : 14/977045
DATED : August 15, 2017
INVENTOR(S) : Akira Minezawa et al.

It is certified that error appears in the above-identified patent and that said Letters Patent is hereby corrected as shown below:

In the Claims

Claim 2, at Column 31, Lines 27-28, after "intermediate prediction value" delete the phrase "and according to a size of the block".

Signed and Sealed this
Thirty-first Day of October, 2017

Joseph Matal
*Performing the Functions and Duties of the
Under Secretary of Commerce for Intellectual Property and
Director of the United States Patent and Trademark Office*